US011683497B2

(12) United States Patent
Van Cao et al.

(10) Patent No.: US 11,683,497 B2
(45) Date of Patent: *Jun. 20, 2023

(54) MOVING PICTURE ENCODING DEVICE AND METHOD OF OPERATING THE SAME

(71) Applicant: RENESAS ELECTRONICS CORPORATION, Tokyo (JP)

(72) Inventors: Hung Van Cao, Tokyo (JP); Toshiyuki Kaya, Tokyo (JP); Tetsuya Shibayama, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/076,509

(22) Filed: Oct. 21, 2020

(65) Prior Publication Data

US 2021/0136387 A1 May 6, 2021

(30) Foreign Application Priority Data

Nov. 6, 2019 (JP) .............................. JP2019-201735

(51) Int. Cl.
*H04N 19/51* (2014.01)
*H04N 19/105* (2014.01)
(Continued)

(52) U.S. Cl.
CPC ......... *H04N 19/146* (2014.11); *H04N 19/105* (2014.11); *H04N 19/119* (2014.11);
(Continued)

(58) Field of Classification Search
None
See application file for complete search history.

(56) References Cited

U.S. PATENT DOCUMENTS 6,480,542 B1 * 11/2002 Prange ................. H04N 19/423
375/240.15
7,333,542 B1   2/2008 Tajime et al.
(Continued)

FOREIGN PATENT DOCUMENTS

JP    2000-013801 A    1/2000
JP    2004-266731 A    9/2004
(Continued)

OTHER PUBLICATIONS

H. Aoki et al., "TE2: 1-D DPCM-based memory compression", Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010.

(Continued)

*Primary Examiner* — Mohammad J Rahman
(74) *Attorney, Agent, or Firm* — McDermott Will & Emery LLP

(57) ABSTRACT

A video image encoding device includes: an image encoding unit that performs predictive encoding by obtaining a difference between a divided image included in a frame as a target of predictive encoding and a prediction image; local decode generation unit that decodes an encoding result of the divided image by the image encoding unit to generate a reference image; a first buffer that stores pixel data generated by the local decode generation unit; a compression unit that refers to the first buffer to compress the reference image and generates compressed data; an allowable data amount setting unit that presets an allowable data amount to be stored in the memory for each predetermined area of the frame as the target of the predictive encoding; and a reference image storage determination unit that determines whether the compressed data is store in the memory based on the allowable data amount, and stores the compressed data in the memory (Continued)

based on a determination result of storing the compressed data in the memory.

19 Claims, 21 Drawing Sheets

(51) Int. Cl.
    *H04N 19/119*     (2014.01)
    *H04N 19/146*     (2014.01)
    *H04N 19/159*     (2014.01)
    *H04N 19/172*     (2014.01)
    *H04N 19/176*     (2014.01)
(52) U.S. Cl.
    CPC ......... *H04N 19/159* (2014.11); *H04N 19/172* (2014.11); *H04N 19/176* (2014.11); *H04N 19/51* (2014.11)

(56) References Cited

U.S. PATENT DOCUMENTS

| | | | | |
|---|---|---|---|---|
| 8,958,479 | B2* | 2/2015 | Mochizuki | H04N 19/61 375/240.16 |
| 9,501,879 | B2* | 11/2016 | Funabashi | G07C 5/0866 |
| 2004/0175049 | A1 | 9/2004 | Yamamoto et al. | |
| 2007/0025443 | A1 | 2/2007 | Inokuma | |
| 2007/0242749 | A1* | 10/2007 | Sung | H04N 19/61 375/240.16 |
| 2007/0286502 | A1* | 12/2007 | Uetani | H04N 19/428 382/238 |
| 2008/0159654 | A1* | 7/2008 | Tu | H04N 19/59 382/298 |
| 2008/0232465 | A1* | 9/2008 | Zhang | H04N 19/18 375/240.03 |
| 2009/0190843 | A1* | 7/2009 | Jung | H04N 19/43 382/233 |
| 2009/0257485 | A1 | 10/2009 | Youn | |
| 2010/0296588 | A1* | 11/2010 | Fujii | H04N 19/159 375/240.29 |
| 2010/0316123 | A1* | 12/2010 | Inokuma | H04N 19/436 375/E7.243 |
| 2013/0107941 | A1* | 5/2013 | Kazui | H04N 19/176 375/240.03 |
| 2013/0170548 | A1 | 7/2013 | Aoki et al. | |
| 2013/0202044 | A1* | 8/2013 | Kitamura | H04N 19/172 375/240.16 |
| 2014/0064369 | A1* | 3/2014 | Laroche | H04N 19/139 375/240.13 |
| 2014/0064372 | A1* | 3/2014 | Laroche | H04N 19/176 375/240.16 |
| 2015/0277776 | A1* | 10/2015 | Okamoto | H04N 19/593 382/244 |
| 2016/0373740 | A1* | 12/2016 | Nagumo | H04N 19/14 |
| 2017/0078682 | A1* | 3/2017 | Matsui | H04N 19/127 |
| 2017/0163988 | A1* | 6/2017 | Lu | H04N 19/428 |
| 2017/0324979 | A1* | 11/2017 | Zhu | H04N 19/147 |
| 2018/0109802 | A1* | 4/2018 | Takeda | H04N 19/105 |
| 2018/0262758 | A1* | 9/2018 | El-Ghoroury | H04N 13/344 |
| 2018/0359482 | A1* | 12/2018 | Kobayashi | G06T 3/4053 |

FOREIGN PATENT DOCUMENTS

| | | |
|---|---|---|
| JP | 2007-036738 A | 2/2007 |
| JP | 2009-260977 A | 11/2009 |
| WO | 2012/017945 A1 | 2/2012 |

OTHER PUBLICATIONS

M. U. Demircin et al., "TE2: Compressed Reference Frame Buffers (CRFB)", Joint Collaborative Team on Video Coding (JCT-VC) of ITU-T SG16 WP3 and ISO/IEC JTC1/SC29/WG11, 2nd Meeting: Geneva, CH, Jul. 21-28, 2010.

T. Chujoh et al., "Adaptive scaling for reference pictures memory compression", Joint Collaborative Team on Video Coding (JCT-VC) of ITU-T SG16 WP3 and ISO/IEC JTC1/SC29/WG11, 5th Meeting: Geneva, CH, Jan. 16-23, 2011.

Japanese Notice of Reasons for Refusal issued in corresponding Japanese Patent Application No. 2019-201735, dated Apr. 18, 2023, with English translation.

* cited by examiner

FIG. 13

| | MBL$_{n-1}$ | MBL$_n$ | MBL$_{n+1}$ | MBL$_{n+2}$ |
|---|---|---|---|---|
| | MB99 | MB09 | MB19 | MB29 |
| | MB98 | MB08 | MB18 | MB28 |
| | MB97 | MB07 | MB17 | MB27 |
| | MB96 | MB06 | MB16 | MB26 |
| | MB95 | MB05 | MB15 | MB25 |
| | MB94 | MB04 | MB14 | MB24 |
| | MB93 | MB03 | MB13 | MB23 |
| | MB92 | MB02 | MB12 | MB22 |
| | MB91 | MB01 | MB11 | MB21 |
| | MB90 | MB00 | MB10 | MB20 |

▨ : MB POSITION IN REFERENCE FRAME, CORRESPONDING TO ENCODING TARGET MB

▨ : PRESENCE OF COMPRESSED DATA OF REFERENCE IMAGE

☐ : ABSENCE OF COMPRESSED DATA OF REFERENCE IMAGE

□ : SEARCHABLE RANGE (SEARCH WINDOW) DETERMINED REGARDLESS OF PRESENCE/ABSENCE OF COMPRESSED DATA

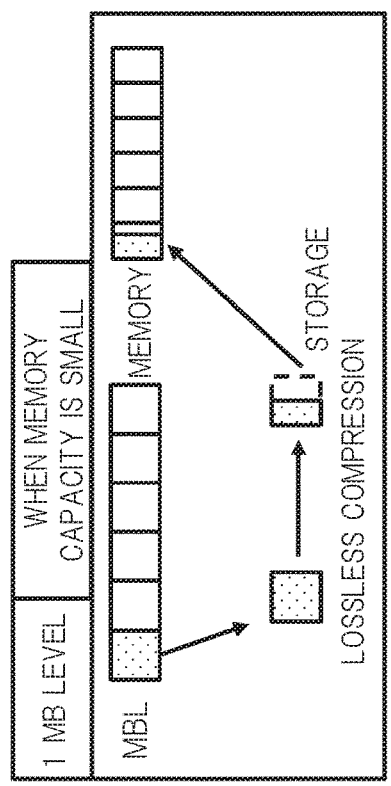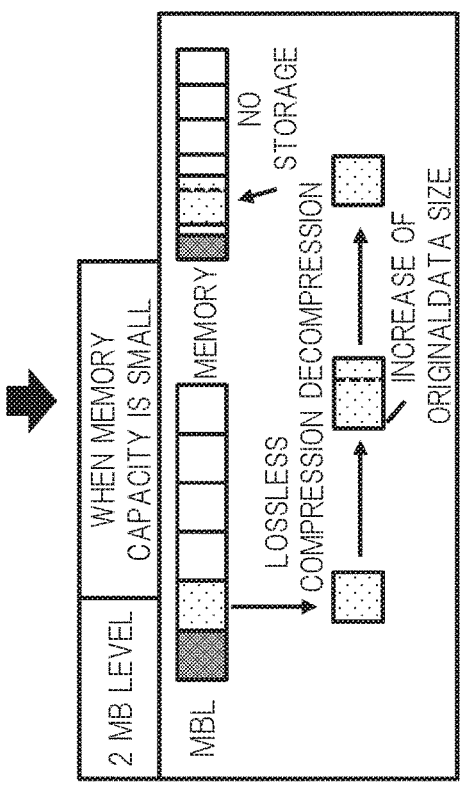
FIG. 20A
FIG. 20B
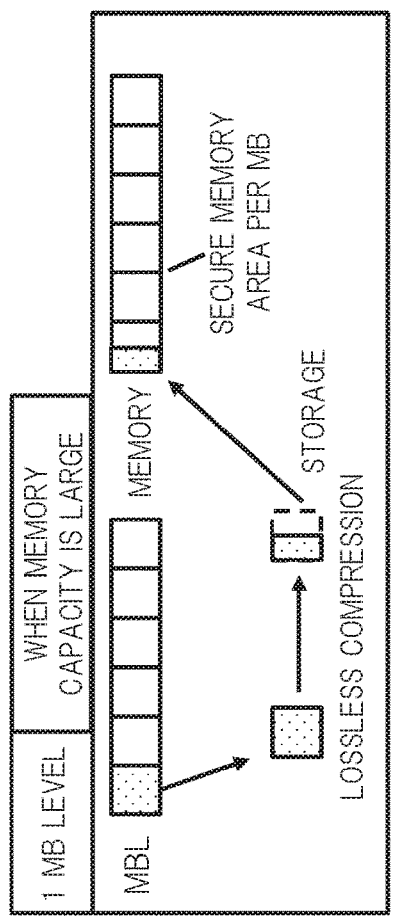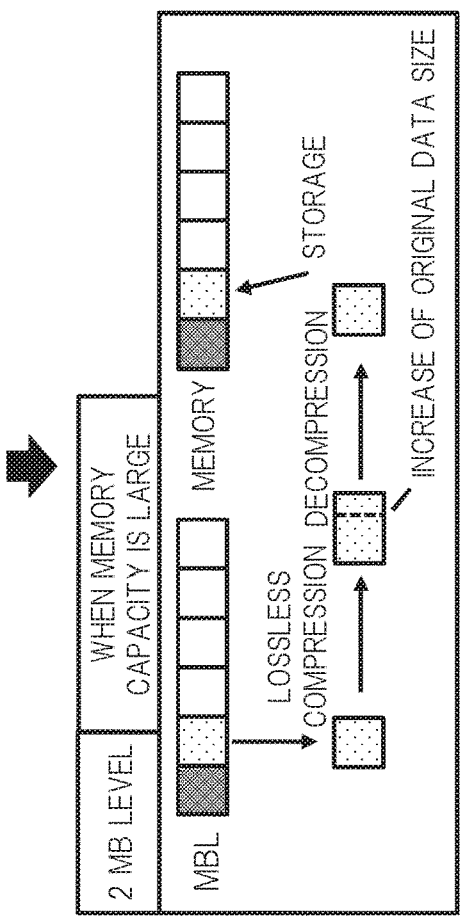
MB: MACROBLOCK
MBL: MACROBLOCK LINE

MOVING PICTURE ENCODING DEVICE AND METHOD OF OPERATING THE SAME

CROSS-REFERENCE TO RELATED APPLICATIONS

The disclosure of Japanese Patent Application No. 2019-201735 filed on Nov. 6, 2019 including the specification, drawings and abstract is incorporated herein by reference in its entirety.

BACKGROUND

The present invention relates to a video image encoding device and an operating method thereof and, for example, to a video image encoding device suitable for performing a compression processing of image data and to an operating method thereof.

Although an amount of information in an image is enormous, a correlation between pixels that are located close to each other in the same frame or between images that are located at the same coordinates in a frame of adjacent frames is strong, so that a code amount is compressed by using the correlation. For example, standardized as typical international standards have been methods of compression encoding and decoding of video images such as MPEG-2 (ITU-T Rec. H.262|ISO/IEC 13818-2), MPEG-4 (ISO/IEC 14496-2), H.264 (ITU-T Rec. H.264|ISO/IEC 14496-10), and H.265 (ISO/IEC 23008-2 HEVC). In these encoding methods, predictive encoding is adopted in order to reduce the code amount and, at the time of encoding, a difference between an image (prediction image) predicted by a certain method and an input image is encoded. Conversely, at the time of decoding, a decoded image is obtained by adding the difference to the prediction image.

The above-described encoding processing is performed for each video screen (frame or field), and a block obtained by subdividing the screen is a processing unit (circuit).

A generating method of the prediction image is roughly classified into two types. One is a method (intra prediction, in-frame prediction, or in-screen prediction) of performing prediction within the same screen by using a single frame. The other is a method (inter prediction, inter-frame prediction, or inter-screen prediction) of performing prediction between frames by using a frame different from the frame to be encoded.

A video image encoding device orthogonally transforms a difference between an original image of an encoding target frame inputted and a prediction image intra-predicted or inter-predicted, quantizes its result, variable-length encodes the quantized result, and sends (transmits) it. Meanwhile, since the video image encoding device generates a reference image (locally decoded image) by performing inverse quantization and inverse orthogonal transform about the result of the quantization processing, and stores the reference image into a reference frame memory in order to use it as a prediction image of subsequent inter-encoding. That is, the video image encoding device writes, via a write bus in the memory, a reference image corresponding to each image of an encoded stream and reads, via the read bus, another reference image written in the memory to encode an encoding target image by using it as a reference image of the inter-prediction.

As described above, the inter-encoding requires a memory for storing the reference image. In this regard, There are disclosed techniques below.

[Patent Document 1] Japanese Unexamined. Patent Application Publication No. 2004-266731
[Patent Document 2] Japanese Unexamined Patent Application. Publication No. 2009-260977

SUMMARY

In general, compression efficiency of the inter-encoding is higher than that of the intra-encoding, so that when a ratio of the inter-encoding is small, image quality deteriorates at the same compression rate. In the video image encoding device disclosed in Patent Document 1, the maximum number of macroblocks to be inter-encoded is determined in advance, so that the maximum number of macroblocks to be inter-encoded is small when the reference image memory is small. Therefore, problems arise from deterioration of the encoding efficiency and occurrence of the image quality.

Meanwhile, in an encoder disclosed in Patent Document 2, if data quantity after the compression is within a predetermined allowable range, lossless compression is performed and if it is outside the allowable range, lossy compression is performed. Further, in the encoder disclosed in Patent Document 2, when it is determined that noise is large during the lossy compression, the encoder is set to non-compression. That is, as shown in a 2-MB (Macro Block) processing level of FIG. 20A, in the encoder disclosed in Patent Document 2, the maximum data size stored in the memory is an uncompressed data size. For this reason, in the encoder disclosed in Patent Document 2, as memory capacity usable by one macroblock, a capacity corresponding to the data size when uncompressed is secured.

As shown in FIG. 20A, when the memory capacity is large, the reference images of all the macroblocks can be stored in the memory while being compressed. However, as shown in FIG. 20B, when the memory capacity is small, the encoder disclosed in Patent Document 2 cannot the memory capacity corresponding to the data size at the time of uncompression with respect to all the macroblocks. Therefore, it is difficult to apply the technique disclosed in Patent Document 2 to a device capable of encoding a video image by using a small-capacity memory.

A problem of an embodiment is to provide a video image encoding device that can perform an encoding processing with high quality by using a small-capacity memory (for example, SRAM (Static Random Access Memory)). Other problems and novel features will be apparent from, the description of the present specification and the description of the drawings.

A video image encoding device according to one embodiment includes: an image encoding unit that performs predictive encoding by obtaining a difference between a divided image included in a frame as a target of predictive encoding and a prediction image; a local decode generation unit that decodes an encoding result of the divided image by the image encoding unit to generate a reference image; a first buffer that stores pixel data generated by the local decode generation unit; a compression unit that refers to the first buffer to compress the reference image and generates compressed data; an allowable data amount setting unit that presets an allowable data amount to be stored in the memory for each predetermined area of the frame as the target of the predictive encoding; and a reference image storage determination unit that determines whether the compressed data is store in the memory based on the allowable data amount, and stores the compressed data in the memory based on a determination result of storing the compressed data in the memory.

An operating method of a video image encoding device according to another embodiment, the video image encoding device having an image encoding unit, a local decode generation unit, a first buffer, a compression unit, an allowable data amount setting unit, and a reference image storage determination unit, the operating method including: predictively encoding by obtaining a difference between a divided image included in a frame as a target of predictive encoding of video image data and a prediction image by the image encoding unit; decoding an encoding result of the image encoding unit of the divided image by the local decode generation unit to generate a reference image; storing pixel data generated by the local decode generation unit in the first buffer; compressing the reference image with reference to the first buffer by the compression unit to generate compressed data; presetting an allowable data amount to be stored in the memory for each predetermined area of the frame as the target of the predictive encoding by the allowable data amount setting unit; determining whether or not the compressed data is stored in the memory based on the allowable data amount by the reference image storage determination unit; and storing the compressed data in the memory by the reference image storage determination unit based on a determination result of storing the compressed data in the memory.

A video image encoding device according to yet another embodiment including: an image encoding unit performing predictive encoding by obtaining a difference between a first block, which is divided into a plurality of blocks in a matrix and is included in a frame as a target of predictive encoding of a video image, and a reference image generated in encoding of a reference frame; a local decode generation unit decoding an encoding result of the first block to generate a first reference image, and decoding an encoding result of a second block adjacent to the first block to generate a second reference image; a first buffer storing pixel data included in the second reference image;

a compression unit compressing the first reference image by referring to the first buffer and generates compressed data; an allowable data amount setting unit that presets an allowable data amount to be stored in the memory for each predetermined area of the frame as the target of the predictive encoding; and a reference image storage determination unit determining whether or not the compressed data is stored in the memory based on the allowable data amount, and storing the compressed data in the memory based on a determination result of storing the compressed data in the memory.

According to one embodiment, the video image encoding device can perform an encoding processing with high quality by using a small-capacity memory.

BRIEF DESCRIPTION OF THE DRAWINGS

FIG. 13 is a view exemplifying a storage state of compressed data of a frame referred to by the video image encoding apparatus according to the first embodiment;

FIG. 20A is a view showing an operation example when an encoder according to a conventional technique (Patent Document 2) compresses a reference image; and FIG. 20B is a view showing an operation example when an encoder according to a conventional technique (Patent Document 2) compresses a reference image.

DETAILED DESCRIPTION

Figure 1:
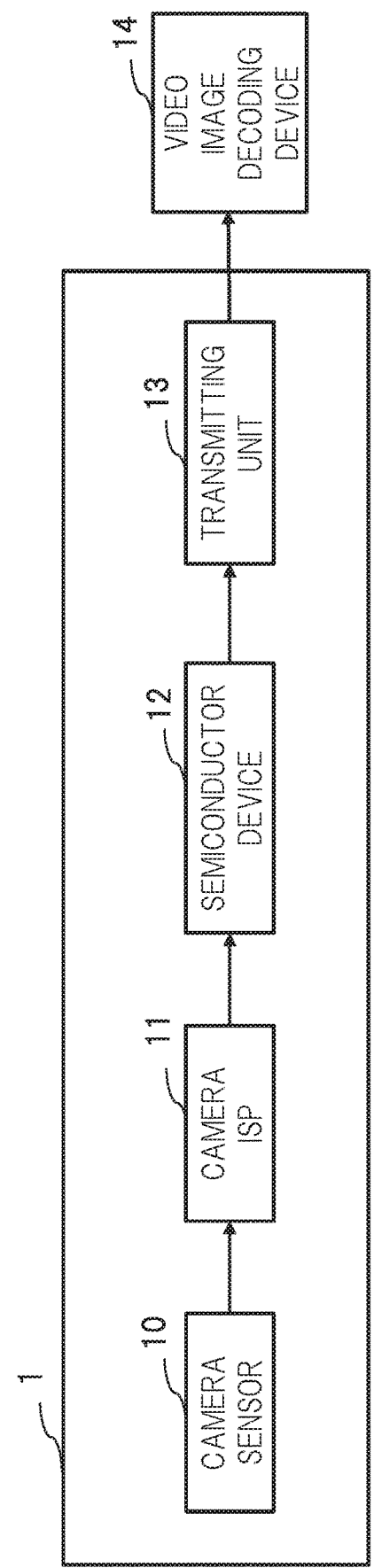
FIG. 1 is a block diagram showing a configuration example of a camera module according to a first embodiment.

For clarity of explanation, the following description and drawings are appropriately omitted and simplified. In addition, each element illustrated in the drawings as a functional block that performs various processings can be configured by a CPU (Central Processing Unit), a memory, and other circuits in terms of hardware, and is realized by a program etc. loaded in a memory in terms of software. Therefore, it is understood by those skilled in the art that these functional blocks can be realized in various forms by only hardware, only software, or a combination thereof, and the present invention is not limited to any of them. Incidentally, in each drawing, the same elements are denoted by the same reference numerals, and redundant description will be omitted as necessary.

Also, the program described above can be stored by using various types of non-transitory computer-readable media and be supplied to the computer. The non-transitory computer-readable media include various types of tangible storage media. Examples of non-transitory computer-readable media include magnetic recording media (e.g., flexible disk, magnetic tape, hard disk drive), magneto-optical recording media (e.g., magneto-optical disk), CD-ROM (Read Only Memory), CD-R, CD-R/W, and semiconductor memories (e.g., mask ROM, PROM (Programmable ROM), EPROM (Erasable PROM), flash ROM, RAM (Random Access Memory)). Also, the program may be supplied to the computer by various types of transitory computer-readable media. Examples of transitory computer-readable media include electrical signals, optical signals, and electromagnetic waves. The transitory computer-readable medium can supply the program to the computer via a wired communication path such as an electric wire and an optical fiber, or a wireless communication path.

Embodiment 1

(Configuration)

FIG. 1 is a block diagram showing a configuration example of a camera module 1 according to a first embodiment. The camera module 1 according to the present embodiment is provided, for example, on a right, front side, a left front side, a right rear side, and a left rear side of a vehicle, and captures a landscape (video) around the vehicle as a video image. As shown in FIG. 1, the camera module 1 has: a camera sensor 10; a camera ISP (Image Signal Processor) 11; a semiconductor device 12 including a video image encoding device; and a transmitting unit 13.

The camera sensor 10 is an imaging device that captures a video image of its surroundings, and outputs the captured video image to the camera ISP 11.

The camera ISP 11 receives video image data captured by the camera sensor 10, performs adjustment of white balance, distortion correction, and conversion of data format, and outputs the video image data to the semiconductor device 12. A processing performed by the camera. ISP is not limited to the above example, and may include various processings for video image data.

The semiconductor device 12 includes a video image encoding device. The semiconductor device 12 generates an encoded stream (bit stream) by encoding an input video image of an encoding target that is inputted from the camera ISP 11. The semiconductor device 12 outputs the generated bit stream to the transmission unit 13.

The transmission unit 13 transmits the bit stream to a video image decoding device 14 located outside the camera module 1 via a wired network or a wireless network.

Incidentally, FIG. 1 is a block diagram showing a configuration example of the camera module 1, and the configuration of the camera module 1 may be different from that in FIG. 1. For example, the camera ISP 11 may be included in the semiconductor device 12. Further, a part of the transmitting unit 13 may be included in the semiconductor device 12.

Figure 2:
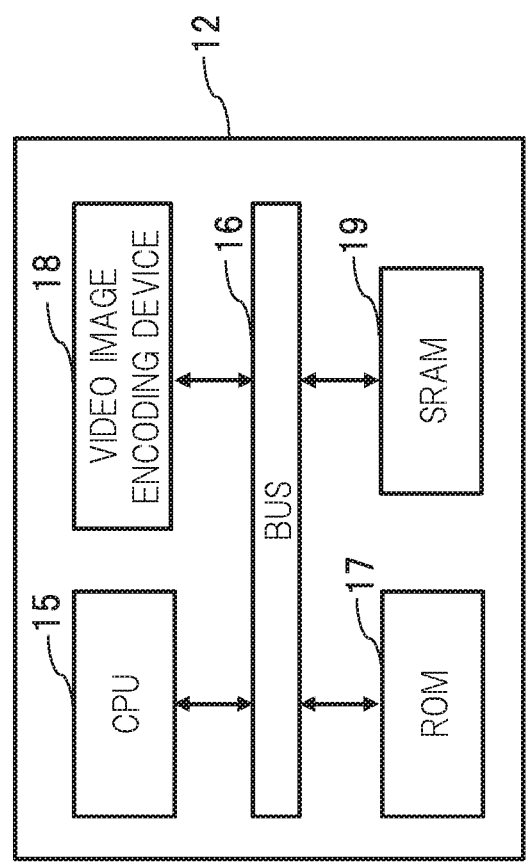
FIG. 2 is a block diagram showing a configuration example of a semiconductor device including a video image encoding device according to the first embodiment.

Next, FIG. 2 is a block diagram showing a configuration example of the semiconductor device 12 including the video image encoding device according to the first embodiment.

As shown in FIG. 2, the semiconductor device 12 includes a CPU 15, a bus 16, a ROM 17, a video image encoding device 18, and an SRAM 19.

The CPU 15 reads a program stored in the ROM 17 via the bus 16, and executes an instruction. The CPU 15 can execute the program and write setting values to various control registers (not shown) that control operations of the video image encoding device 18. In addition to the control registers, the CPU 15 can read various registers such as status registers indicating processing states of the video image encoding device 18. The video image encoding device 18 can write the reference image into the SRAM 19 via the bus 16, and read it.

Incidentally, FIG. is a block diagram showing one configuration example of the semiconductor device 12, and the configuration of the semiconductor device 12 may be different from this. For example, the semiconductor device 12 may incorporate the camera ISP 11 shown in FIG. 1.

Figure 3:
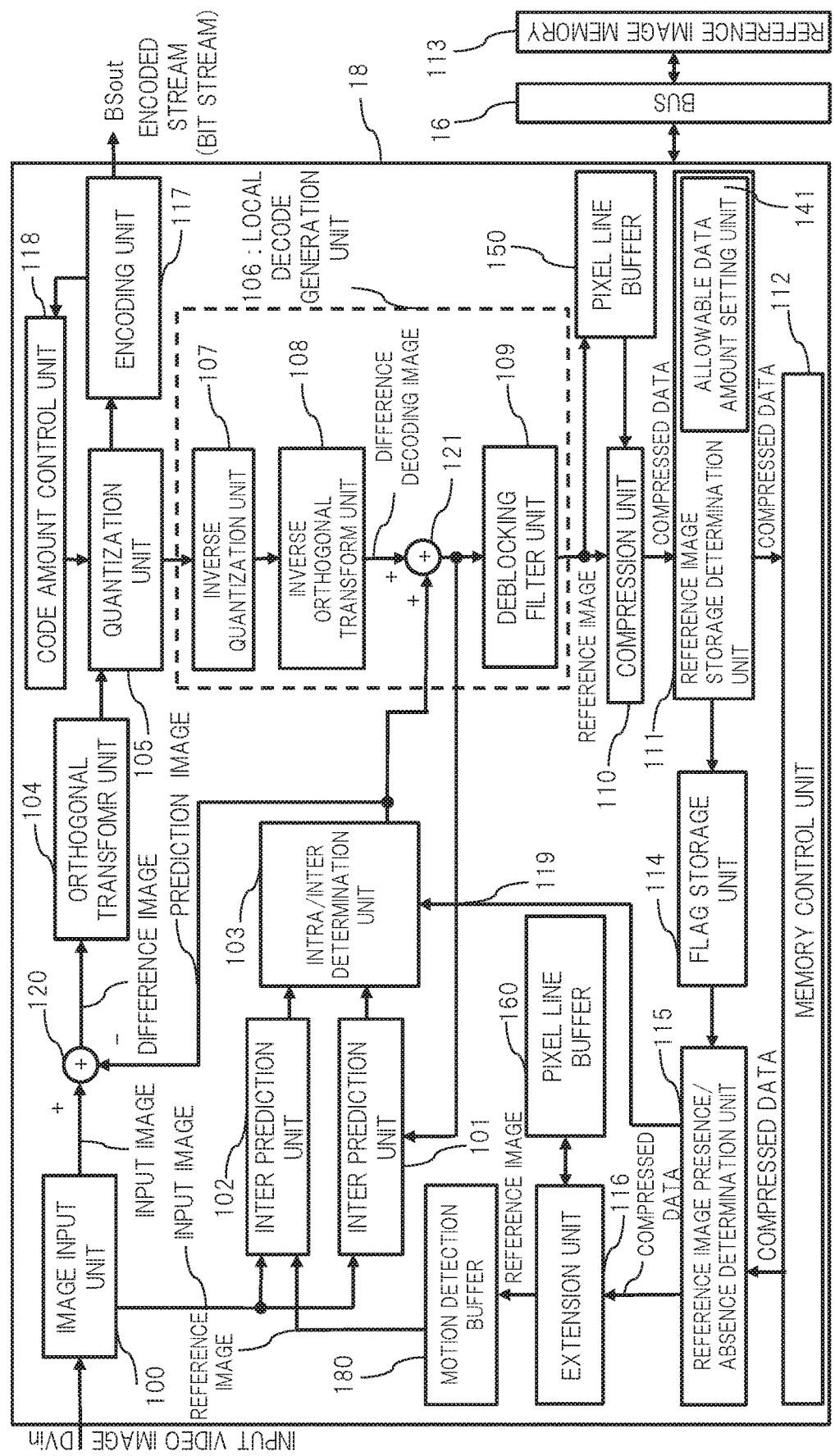
FIG. 3 is a block diagram showing a configuration example of the video image encoding device according to the first embodiment.

FIG. 3 is a block diagram showing a configuration example of the video image encoding device 18 according to the first embodiment. As illustrated in FIG. 3, the video image encoding device 18 includes an image input unit 100, an intra prediction unit 101, an inter prediction unit 102, an intra/inter determination unit 103, an orthogonal transform unit 104, a quantization unit 105, a local decode generation unit 106, a compression unit 110, a reference image storage determination unit 111, a memory control unit 112, a flag storage unit 114, a reference image presence/absence determination unit 115, an extension unit 116, an encoding unit 117, a code amount control unit 118, a subtractor 120, and an adder 121.

The image input unit 100 receives an input video image DVin. The image input unit 100 has a function of adjusting a difference between a frequency of the input video image DVin and an operating frequency of the video image encoding device 18. For example, the image input unit 100 includes a buffer that temporarily stores the input video image DVin in order to adjust the frequency difference. The image input unit 100 divides, based on the received input video image DVin, the image of a predictive encoding target into blocks each having a size that conforms to a video image encoding method. In other words, the image input unit 100 receives a frame to be a predictive encoding target of video image data, and generates the divided images. The image input unit 100 transmits the input image to the subtractor 120 in order to encode a block (for example, a macroblock) that is an encoding unit of a video image frame. The image input unit 100 also transmits the input image to the intra prediction unit 101 and the inter prediction unit 102 in order to calculate an encoding cost described later.

The intra prediction unit 101 calculates the intra encoding cost required for intra encoding by using a difference between an intra predicted image used for intra prediction and the input image. The intra prediction unit transmits the calculated intra encoding cost to the intra/inter determination unit 103. Furthermore, the intra prediction unit 101 transmits the intra prediction image used for intra prediction to the intra/inter determination unit 103.

The inter prediction unit 102 performs motion prediction. Further, the inter prediction unit 102 calculates an inter encoding cost required for inter encoding by using a difference between the input image and the reference image based on a result of the motion prediction. The inter prediction unit 102 uses the reference image obtained by extending the compressed data with the extension unit 116 as a search range for motion detection in order to calculate the inter encoding cost. Furthermore, the inter prediction unit 102 transmits, to the intra/inter determination unit 103, as an inter prediction image used for the inter prediction, a prediction image with the minimum inter encoding cost (inter prediction image). In other words, the inter prediction unit transmits, to the intra/inter determination unit 103, the inter prediction image and the inter encoding cost corresponding to the inter prediction image.

The intra/inter determination unit 103 determined whether the divided images to be predictive encoding targets are intra-encoded or inter-encoded based on an intra encoding cost transmitted from the intra prediction unit 101; an inter encoding cost transmitted from the inter prediction unit 102; and reference image presence/absence information. 119 transmitted from the reference image presence/absence determination unit 115. The intra/inter determination unit 103 transmits, to the subtractor 120, a prediction image selected according to a determined prediction mode.

The subtractor 120 calculates a difference between the input image and the prediction image transmitted from the intra/inter determination unit 103, and transmits the difference image to the orthogonal transform unit 104.

The orthogonal transform unit 104 performs an orthogonal transform processing such as DCT (Discrete Cosine Transform or DST (Discrete Sine Transform) with respect to the difference image between the input image and the prediction image, the difference image being outputted by the subtractor 120. For example, when the orthogonal transform of the orthogonal transform unit 104 is DOT, the orthogonal transform unit 104 calculates a DOT coefficient and sends it to the quantization unit 105.

The quantization unit 105 performs a quantization processing about a result of an orthogonal transform processing by the orthogonal transform unit 104 according to a quantization scale inputted from the code amount control unit 118. For example, when the orthogonal transform of the orthogonal transform unit 104 is DOT, the quantization unit 105 quantizes the DOT coefficient outputted from the orthogonal transform unit 104.

The local decode generation unit 106 includes an inverse quantization unit 107, an inverse orthogonal transform unit 108, an adder 121, and a deblocking filter unit 109. The local decode generation unit 106 generates a reference image based on a quantization processing result transmitted from the quantization unit 105 and on the prediction image, and outputs the generated reference image to the compression unit 110.

The inverse quantization unit 107 performs an inverse quantization process about a result of the quantization processing performed by the quantization unit 105. The inverse orthogonal transform unit 108 performs an inverse orthogonal transform processing about a result of the inverse quantization processing performed by the inverse quantization unit 107. For example, when the orthogonal transform of the orthogonal transform unit 104 is DOT, the inverse quantization unit 107 performs inverse quantization with respect to the quantized DOT coefficient. The inverse orthogonal transformation unit 108 also outputs a differential decoding image by performing inverse DOT with respect to the DOT coefficient dequantized by the inverse quantization unit 107.

The adder 121 adds the differential decoding image transmitted from the inverse orthogonal transform unit. 108 and the prediction image, and outputs an addition result to the deblocking filter unit 109.

The deblocking filter unit 109 performs a deblocking filter processing with respect to the addition result of the adder 121 to generate a reference image. When the filter is turned off in the deblocking filter unit 109, the deblocking filter unit 109 outputs as a reference image the addition result of the adder 121. When the filter is turned on in the deblocking filter unit 109, the deblocking filter unit 109 performs the deblocking filter processing with respect to the addition result of the adder 121, and outputs its result as a reference image.

The compression unit 110 losslessly compresses the reference image received from the local decode generation unit 106, and outputs it to the reference image storage determination unit 111.

A pixel line buffer (first buffer) 150 is a storage circuit for storing: data on the lowest pixel line of a block adjacent to an upper-left side of the block of an encoding target (also referred to as "encoding block"); data on the lowest pixel line of a block adjacent to an upper side of the encoding block; and data on a rightmost-and-vertical-row pixel line of a block adjacent to a left side of the encoding block. The compression unit 110 uses the pixel data stored in the pixel line buffer 150 to search for prediction data having the smallest difference from the encoding block. Then, the compression unit 110 encodes information indicating a prediction mode for minimizing the difference (hereinafter, referred to as "compression prediction mode") and a difference value between the pixel data of the encoding block and the prediction data, and generates compressed data. Details of the pixel line buffer 150 will be described later with reference to FIG. 6.

The reference image storage determination unit 111 determines whether to store the compressed data received from the compression unit 110 in the reference image memory 113, the compressed data being obtained by compressing the reference image (referred to as "compressed data of the reference image"). When storing the compressed data in the reference image memory 113, the reference image storage determination unit 111 requests the memory control unit 112 to write it in the reference image memory 113 and transmits the compressed data. The reference image storage determination unit 111 includes an allowable data amount setting unit 141. The allowable data amount setting unit 141 will be described later with reference to FIG. 8.

The flag storage unit 114 stores a flag indicating whether or not the compressed data is stored in the reference image memory 113 based on a determination result of the reference image storage determination unit 111.

The memory control unit 112 performs control for writing the compressed data in the reference image memory 113 based on the request from the reference image storage determination unit 111. Further, the memory control unit 112 performs control for reading the compressed data from the reference image memory 113 based on the request from the reference image presence/absence determination unit 115. More specifically, the memory control unit 112 performs read or write access to the reference image memory 113 in the SRAM via the bus 16.

The reference image memory 113 is a storage device for storing the compressed data of the reference image. The reference image memory 113 is provided in the semiconductor device 12 as a part or the whole of the SRAM 19.

The reference image presence/absence determining unit 115 reads information on presence/absence of a reference image stored in the flag storage unit 114. When the compressed data of the reference image is stored in the reference image memory 113, the reference image presence/absence determining unit 115 requests the memory control unit 112 to read the reference image. Based on this request, the memory control unit. 112 reads the compressed data of the reference image from the reference image memory 113, and transmits the compressed data to the extension unit 116 via the reference image presence/absence determination unit 115.

The extension unit 116 performs an extension processing to the compressed data of the reference image read from the reference image memory 113 and transmits, to the inter prediction unit 102, the reference image that is a result obtained by performing the extension processing. Details of the extension unit 116 will be described later with reference to FIG. 9.

The pixel line buffer (second buffer) 160 is a storage circuit for storing pixel data included in a block (for example, a macroblock) that the extension unit 116 refers to when extending a reference image. Details of the pixel line buffer 160 will be also described later with reference to FIG. 9.

A motion detection buffer (third buffer) 180 is a memory (storage) circuit for storing the reference image extended by the extension unit 116. The motion detection buffer 180 stores all the of pieces of reference image data contained in a range (hereinafter, may be referred to as 'search window') for searching a reference image in order to encode a block (for example, macroblock) of an encoding target.

An encoding unit 117 executes an encoding processing about a result obtained by a quantization processing of the quantization unit 105, thereby generating an encoded stream (bit stream) BSout.

The code amount control unit. 118 adjusts a quantization scale based on the code amount generated by the encoding unit 117, and transmits the adjusted quantization scale to the quantization unit 105. The quantization unit 105 performs a subsequent quantization processing based on the adjusted quantization scale.

Figure 4:
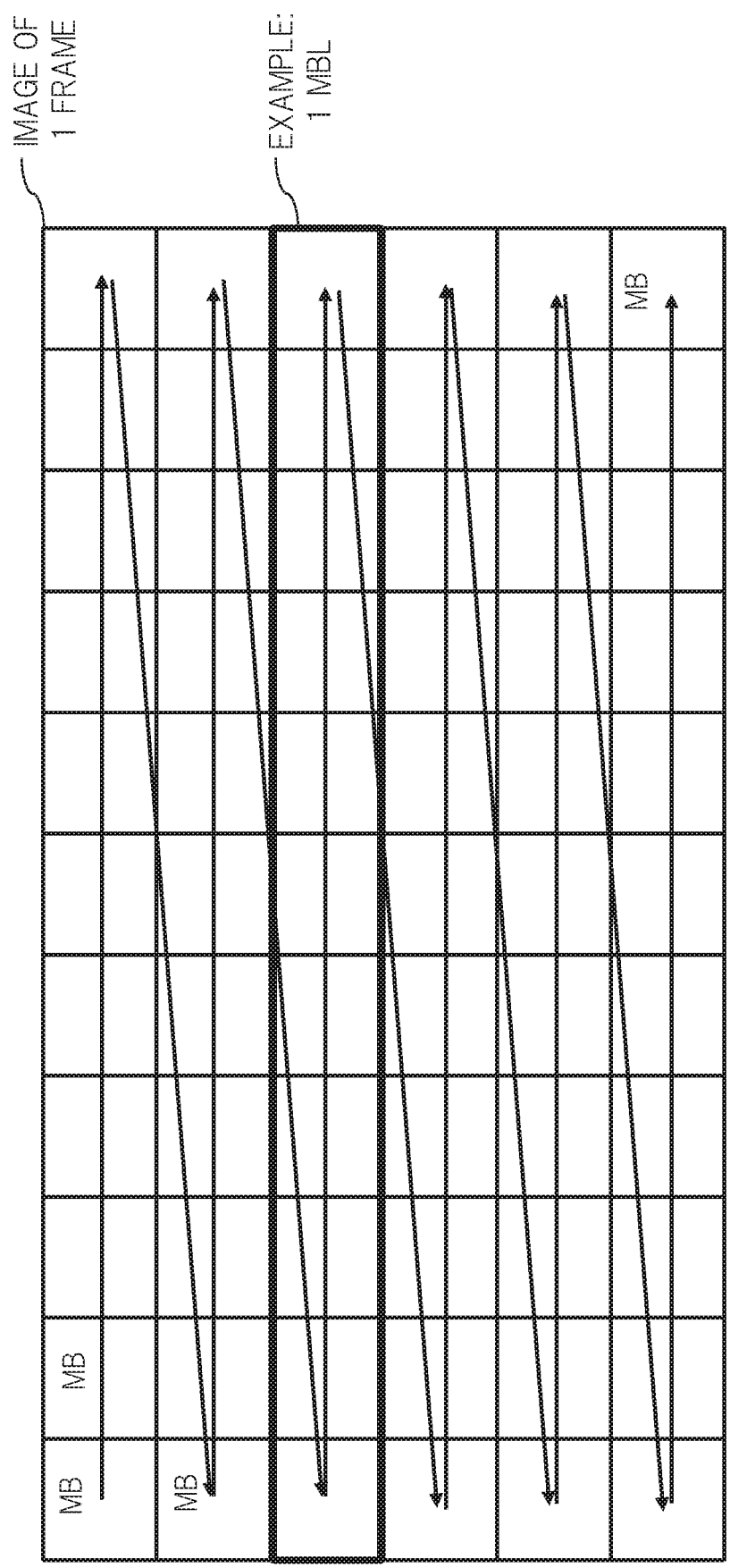
FIG. 4 is a view showing a state where the video image encoding device according to the first embodiment divides an image of one frame into a plurality of images and encodes the divided images in predetermined order.

Next, the pixel line buffer 150 will be described in detail with reference to FIGS. 4, 5, 6, and 7. FIG. 4 is a view showing a state where the video image encoding device 18 divides an image of one frame into a plurality of images, and encodes the divided images in predetermined order. As shown in FIG. 4, the image in the frame is divided into a plurality of rectangular blocks. For example, in MPEG, an image of one frame is usually divided into rectangular blocks called macroblocks (MB) of 16 pixels×16 pixels. That is, the image of one frame that is a target of predictive encoding of video image data includes a plurality of divided images (MB) in units of macroblocks (MB). Further, the plurality of divided images (MB) in one frame are arranged in a matrix as shown in FIG. 4. Here, as an example, a plurality of divided images (MB) arranged in 6 rows×11 columns are shown. Each row of a plurality of macroblocks (MBs) arranged in a lateral direction (row direction) from a left end to a right end along a direction of an encoding processing is called a macroblock line (Macro Block Line) MBL. In FIG. 4, an example of the macroblock line MBL is shown as 1 MBL surrounded by a thick quadrangle. The encoding of a video image is performed in units of macroblocks (MB). The video image encoding device 18 performs an encoding processing of each rectangular block in order of arrows from an upper left toward a lower right within one frame. In the description using FIGS. 4, 5, 6, and 7, it is assumed that the rectangular block is a macroblock (MB). However, the rectangular block is not limited to the macroblock (MB). For example, the rectangular block may be a decoding unit defined by an H.264, or be a rectangular block not limited to a specific standard.

Figure 5:
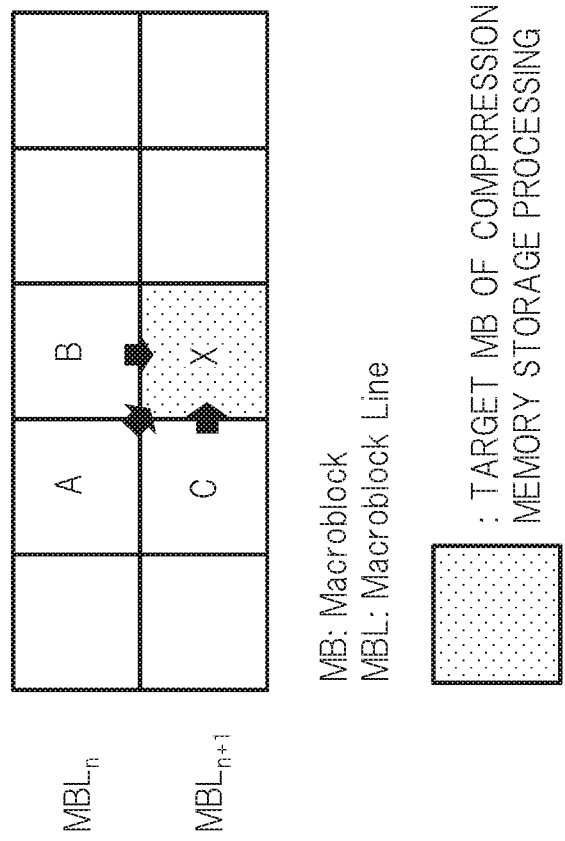
FIG. 5 is a view showing a position of a macroblock that a compression unit according to the first embodiment refers to in compressing a reference image corresponding to a macroblock of an encoding target.

FIG. 5 is a view showing blocks that the compression unit 110 refers to when compressing a reference image corresponding to an encoded block. More specifically, FIG. 5 shows a part of MBLn which is the macroblock line of the nth row from a top of the frame, and a part of MBLn+1 which is the macroblock line of the (n+1)th row. In FIG. 5, the current encoded block is a in macroblock X included in the macroblock line MBLn+1. When the macroblock X is encoded, the compression unit 110 refers to a macroblock A adjacent to an upper left side of the macroblock X, a macroblock B adjacent to an upper side of the macroblock X, and a macroblock C adjacent to a left side of the macroblock X. The macroblock A and the macroblock B are macroblocks included in the macroblock line MBLn. The macroblock C is a macroblock included in the macroblock line MBLn+1. The reason why the compression unit 110 refers to the adjacent macroblocks is that, in the vicinity of the macroblock of an encoding target (also referred to as "encoding macroblock"), there is a high possibility that pixel data having a value close to the pixel data included in the encoding macroblock is present. Compared to a case where the pixel data itself included in the encoding macroblock is compressed, it is more efficient in data compression to compress a difference between the neighboring pixel data and the pixel data included in the encoding macroblock. Therefore, the video image encoding device 18 includes the pixel line buffer 150 in order to store a part of the pixel data included in a macroblock adjacent to the encoding macroblock.

Figure 6:
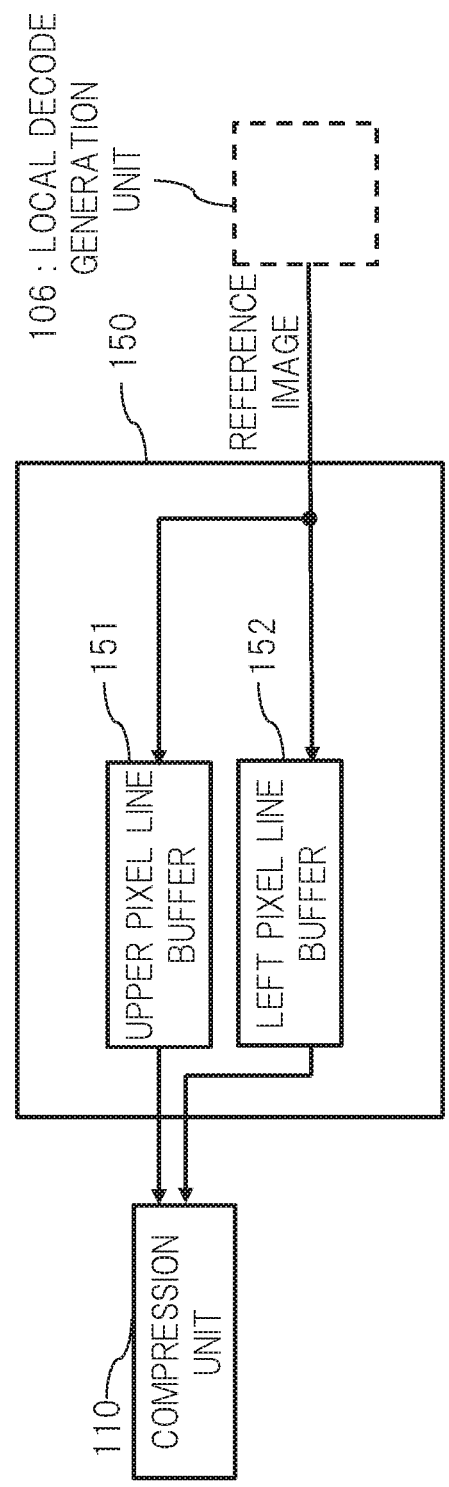
FIG. 6 is a view showing a configuration example of a pixel line buffer according to the first embodiment.

FIG. 6 is a block diagram showing a configuration example of the pixel line buffer 150. The pixel line buffer 150 includes an upper pixel line buffer 151 and a left pixel line buffer 152. The upper pixel line buffer 151 is a storage circuit for storing the data of the lowermost pixel line included in the macroblock in line that is located one above the macroblock line including the encoding macroblock. Since one macroblock has 16×16 pixels, the upper pixel line buffer 151 stores (the number of macroblocks included in one macroblock line)×16 pixel data. The left pixel line buffer 152 is a storage circuit for storing the data of the rightmost pixel line of the macroblock that is located to the left side of the encoding macroblock.

Figure 7:
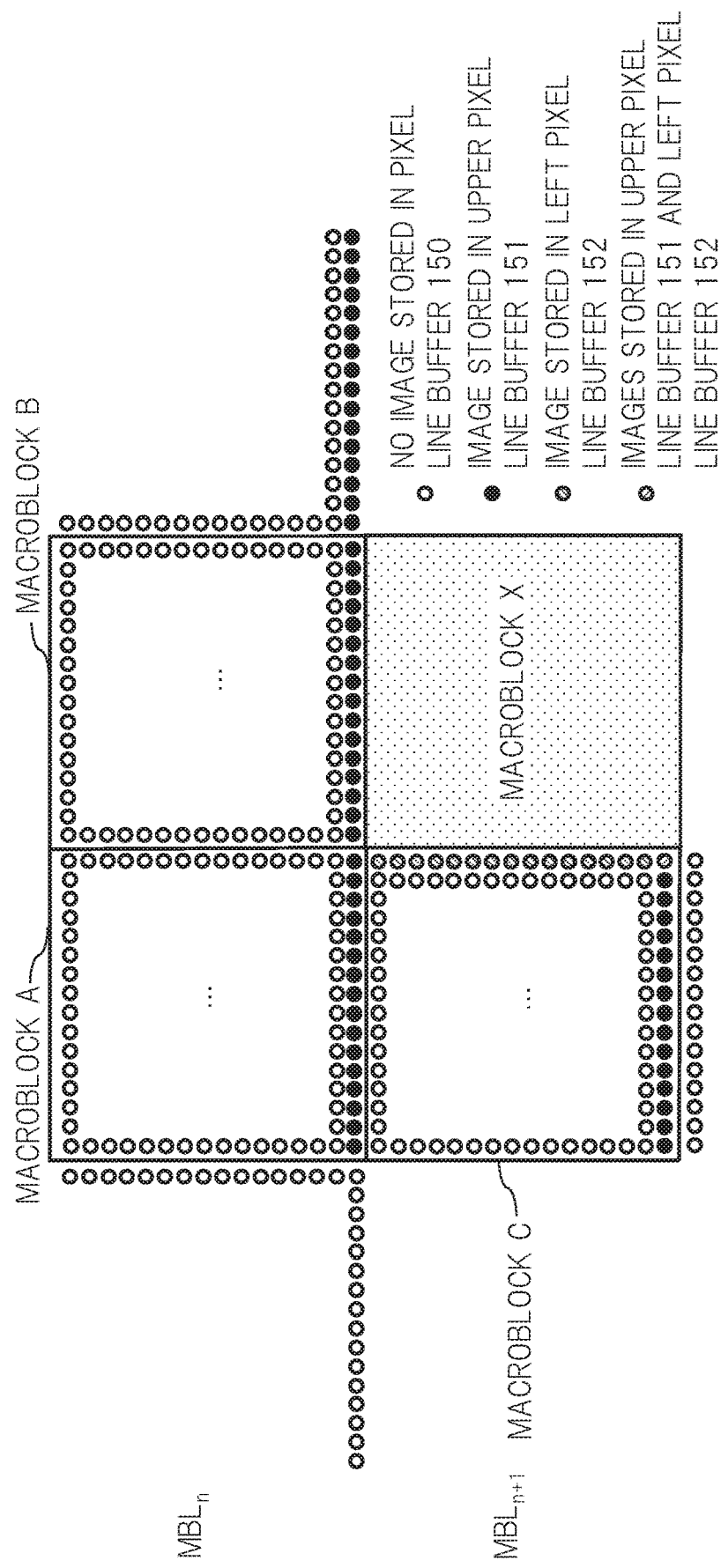
FIG. 7 is a diagram for explaining pixel data stored in the pixel line buffer according to the first embodiment.

FIG. 7 is a diagram for explaining pixel data stored in the pixel line buffer 150. When compressing the pixel data included in the macroblock X, the compressing unit 110 refers to 16 pixel data at the lowest location of the macroblock A, 16 pixel data at the lowest location of the macroblock B, and 16 pixel data at the rightmost location of the macroblock C, and compresses the pixel data. The 16 pixel data at the lowest location of the macroblock A and the 16 pixel data at the lowest location of the macroblock B are stored in the upper pixel line buffer 151. The 16 pixel data at the rightmost location of the macroblock C is stored in the left pixel line buffer 152.

Incidentally, as shown in FIG. 7, the upper pixel line buffer 151 determines not only the 32 pieces of pixel data at the lowest locations of the macroblocks A and B but also (the number of macroblocks per 1 MBL)×16 pixel data according to the number of macroblocks included in one macroblock line. More specifically, when the macroblock X is the m-th MB of MBLn+1 (m is a natural number), the upper pixel line buffer 151 stores pixel data at the lowest location from the m-th MB of MBLn to the m-th MB of MBLn+1.

In order to compress the macroblock X, the compression unit 110 reads 32 pieces of pixel data at the lowest location of the macroblocks A and B included in the upper pixel line buffer 151 and 16 pixel data at the rightmost location of the macroblock included in the left pixel line buffer 152, finds a pixel having the smallest difference from the pixel data included in the encoding macroblock, and compresses a difference with it.

When the compression processing of the macroblock X by the compression unit 110 is completed, the pixel line buffer 150 replaces a part of the upper pixel line buffer 151 and contents of the left pixel line buffer 152 by the pixel data included in the reference image corresponding to the macroblock X. Replace with pixel data. This point will be described more specifically with reference to FIG. 7. When the compression processing of the reference image corresponding to the macroblock X is completed, the 16 pieces of pixel data at the lowermost location of the macroblock A is not referred to by the compression unit. 110 thereafter. Therefore, the 16 pieces of pixel data in the macroblock A of the upper pixel line buffer 151 are replaced with the 16 pieces of pixel data lying at the lowermost location and included in the macroblock X. When the compression processing of the macroblock X is completed, the 16 pieces of pixel data at the rightmost location of the macroblock C are not referred to by the compression unit 110 thereafter. Therefore, the 16 pieces of pixel data of the macroblock C stored in the left pixel line buffer 152 are replaced with the 16 pieces of pixel data at the rightmost location of the reference image corresponding to the macroblock X.

Figure 8:
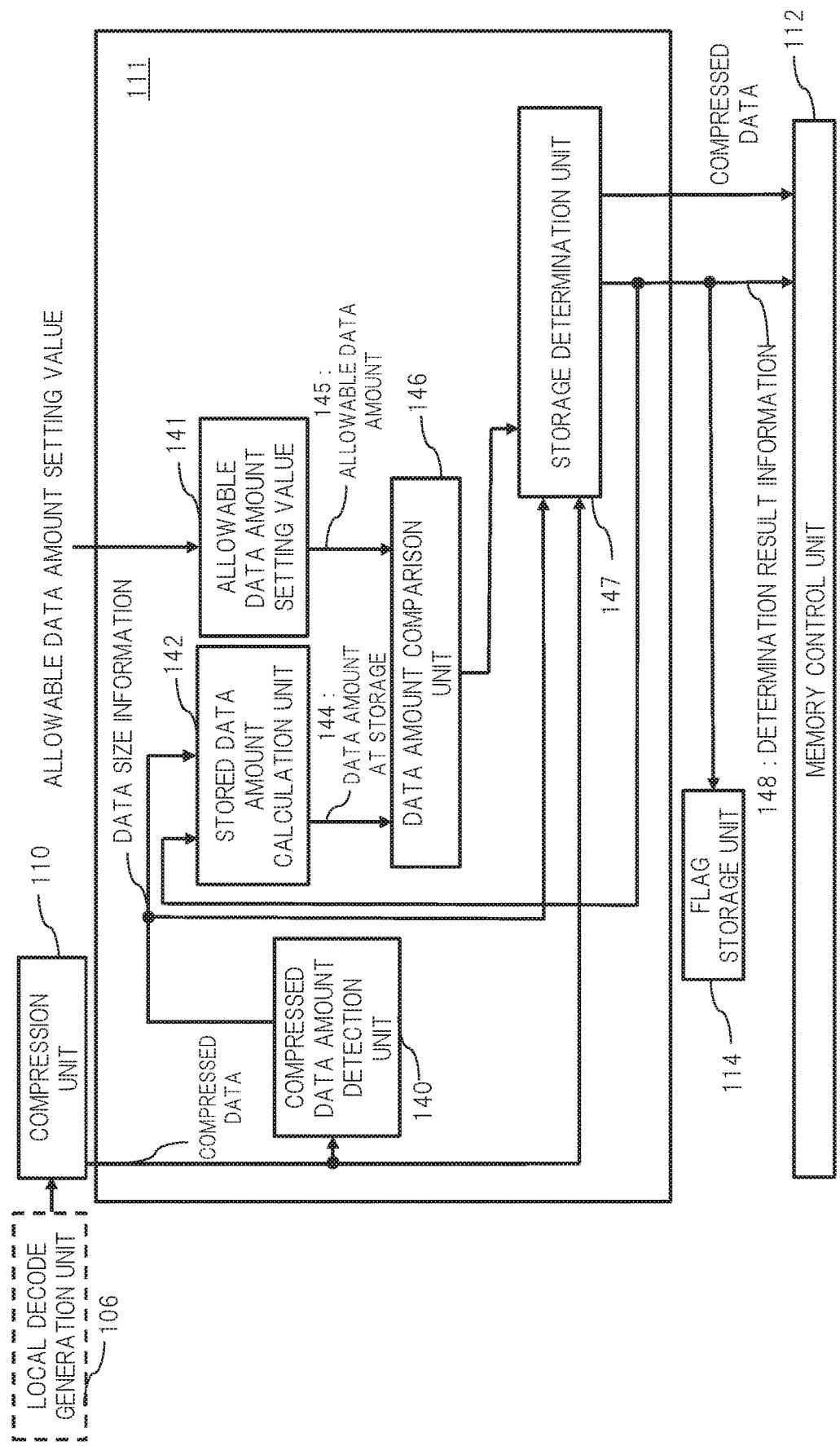
FIG. 8 is a block diagram showing a configuration example of a reference image storage determination unit according to the first embodiment.

FIG. 8 is a block diagram showing a configuration example of a reference image storage determination unit 111. As shown in FIG. 8, the reference image storage determination unit 111 includes a compressed data amount detection unit 140, an allowable data amount setting unit 141, a stored data amount calculation unit 142, a data amount comparison unit 146, and a storage determination unit 147.

The compressed data amount detection unit 140 calculates a data size of the compressed data transmitted from the compression unit 110.

The allowable data amount setting unit 141 presets an allowable data amount of compressed data to be stored in the reference image memory 113 for each predetermined area (hereinafter, may be referred to as "unit area") in the input image. For example, the allowable data amount setting unit 141 is configured by a writable register, and is set by the CPU 15 executing driver (software) of the video image encoding device 18.

The unit area can be set arbitrarily. For example, the unit area may be one macroblock line, two macroblock lines, or one coding unit line.

The allowable data amount 145 can also be set arbitrarily. For example, a value obtained by dividing (subtracting) the usable memory capacity from the number of macroblock included in one by (frame) of the input video image DVin can be set as the allowable data amount 145 in the allowable data amount setting unit 141.

The stored data amount calculation unit 142 adds, for the unit area, the data amount stored in the reference image memory 113 (hereinafter referred to as "stored data amount") and the data size of the compressed data detected by the compressed data amount detection unit 140 and transmits, as a data amount at storage (also referred to as "storage data amount") 144. Since the storage data amount calculation unit 142 calculates the storage data amount 144 for each unit area, it is initialized every time a processing of the unit area is started. That is, at the start of the processing of the unit area, the at-storage data amount is initialized to zero.

The data amount comparison unit 146 compares the allowable data amount 145 set in the allowable data amount setting unit 141 with the at-storage data amount 144 transmitted from the stored data amount calculation unit 142, and transmits a comparison result to the storage determination unit 147.

The storage determination unit 147 determines whether to store the compressed data in the reference image memory 113 based on the comparison result of the data amount comparison unit 146. When the at-storage data amount 144 is equal to or less than the allowable data amount 145, the storage determination unit. 147 transmits determination result information. 148, which indicates that the compressed data is allowed to be stored in the reference image memory 113, to the memory control unit 112, the flag storage unit 114, and the stored data amount calculation unit 142. When the storage determination unit 147 determines to store the compressed data of the reference image in the reference image memory 113, the storage determination unit 147 also transmits the data size information. (length information) of the data to be stored to the flag storage unit 114. The stored data amount calculation unit 142 holds and stores the stored data amount according to the information indicating that determination target compressed data is allowed to be stored in the reference image memory 113.

Meanwhile, when the at-storage data amount 144 is larger than the allowable data amount 145, the storage determination unit 147 transmits determination result information 148, which indicates that the compressed data is not allowed to be stored in the reference image memory 113 based on the comparison result of the data amount comparison unit 146, to the memory control unit 112, the flag storage unit 114, and the stored data amount calculation unit 142. The stored data amount calculation unit 142 holds and stores the stored data amount according to the information indicating that determination target compressed data is not allowed to be stored in the reference image memory 113.

Figure 9:
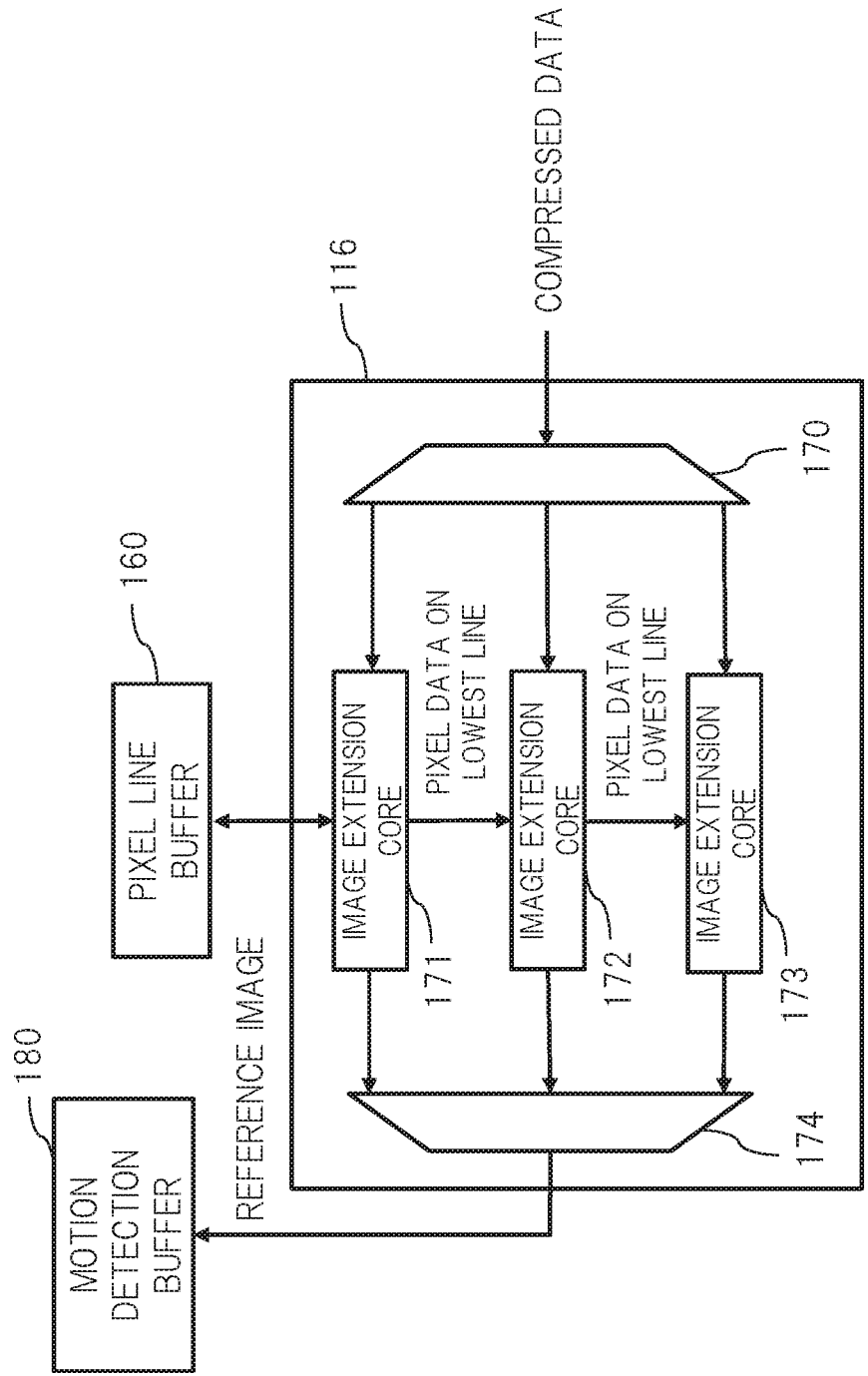
FIG. 9 is a block diagram showing a configuration example of an extension unit according to the first embodiment.

Subsequently, FIG. 9 is a block diagram showing a configuration example of the extension unit 116. As shown in FIG. 9, the extension unit 116 includes a selection unit 170, image extension cores 171, 172, and 173, and a selection unit 174. In order to perform motion detection, the video image encoding device 18 extends (expands) the compressed data by using the extension unit 116 and stores the extended reference image in a motion detection buffer 180.

In order to realize better motion detection in the inter prediction unit 102, it is necessary to widen a search window as a search range of the reference image. One way to achieve the wide search window is to use a high-performance image extension core. Hereinafter, the description of the extension unit 116 will be continued by taking a case where a rectangular block is a macroblock as an example.

The high-performance image extension core must be able to extend H (H is a natural number) macroblocks per one motion detection. Here, H is equal to the number of macroblock lines included in a height direction of the search window. For example, when the search window is an area composed of 3×3 macroblocks, the extension unit 116 needs to extend three macroblocks in order to perform the motion detection with respect to the encoding macroblock. However, designing such a high-performance image extension core involves difficulties in timing design. Therefore, the extension (decompression) unit 116 includes a plurality of image extension cores that perform extension processings in parallel. In the configuration example of FIG. 9, the three image extension cores 171, 172, and 173 are provided to secure three macroblock lines as the height of the search window. FIG. 9 shows an example including three image extension cores, but the number of image extension cores is not limited to this. If a wider search window is required, the number of image extension cores can be set to four or more. If the search window may be narrow (small), the number of two image extension cores that the extension unit 116 has may be two.

The extension unit 116 receives the compressed data corresponding to the three macroblocks read from the reference image memory 113 in order to perform the one motion detection. The selection unit 170 outputs the received three macroblocks to the image extension cores 171, 172, and 173, respectively. The image extension cores 171, 172, and 173 extend the received compressed data, respectively. Here, the compressed data includes information indicating the compression prediction mode, and a difference value between the pixel data of the encoding macroblock and the prediction data. Therefore, each of the image extension cores 171, 172, and 173 extends the compressed data based on the information indicating the compression prediction mode and the difference value between the pixel data of the encoding macroblock and the prediction data. The selection unit 174 inputs the extended reference image outputted by the image extension cores 171, 172, and 173, selects the reference image, and stores the selected reference image in the motion detection buffer 180.

Figure 10:
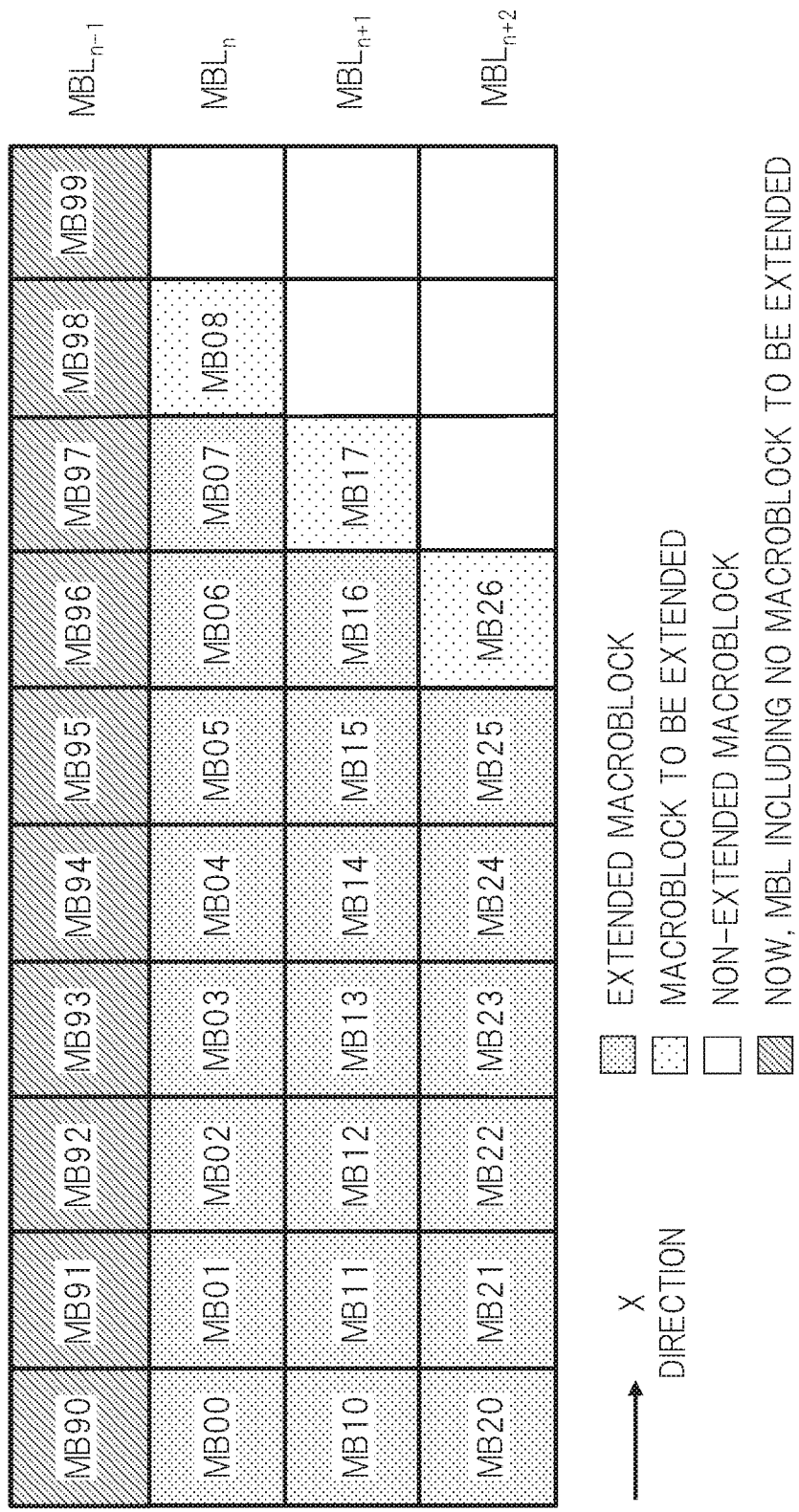
FIG. 10 is a view showing a state where a plurality of image extension cores included in the extension unit according to the first embodiment perform extension processings in parallel.

FIG. 10 a view showing a state where a plurality of image extension cores included in the extension unit 116 perform extension processings in parallel. FIG. 10 shows macroblock lines MBLn−1, MBLn, MBLn+1, and MBLn+2. In FIG. 10, a size of the search window is defined as nine macroblocks included in 3×3 rectangular areas. Since the height of the search window corresponds to three macroblocks, the extension unit 116 is configured to extend the macroblock lines MBLn, MBLn+1, and MBLn+2 in parallel. As a result, the extension unit 116 extends the three macroblocks in parallel in order to perform the one motion detection. Incidentally, the macroblock line MBLn−1 is a macroblock line that has been extended before the extension unit 116 performs the extension processings to the macroblock lines MBLn, MBLn+1, and MBLn+2.

Referring to FIG. 10, the image extension core 171 extends a macroblock MB08 included in the macroblock line MBLn. In parallel with this, the image extension core 172 extends a macroblock MB17 included in the macroblock line MBLn+1. Further, in parallel with these, the image extension core 173 extends a macroblock MB26 included in the macroblock line MBLn+2. As shown in FIG. 10, the image extension cores 171, 172, and 173 extend macroblocks that are spaced one apart in the X direction.

Further, when a macroblock position of the current frame which is the encoding target of the video image encoding device 18 is a position corresponding to MB14, the search window which is the search range of the motion detection is defined as, for example, a range including nine macroblocks of MB03, MB04, MB05, MB13, MB14, MB15, MB23, MB24, and MB25. Since all of these nine macroblocks have been extended, the inter prediction unit 102 can set the search window as a search range. Then, the extension unit 116 pre-extends macroblocks MB08, MB17, and MB26 of the reference frame shown in FIG. 10 in preparation for the next encoding of the macroblock lying at the position corresponding to the MB15 of the current frame. The motion detection buffer 180 stores and memorizes not only all the macroblocks included in the search window but also the macroblocks that have been extended in advance for encoding. When the search window is in the above position, the motion detection buffer 180 also stores and memorizes MB06, MB07, MB08, MB16, MB17, and MB26 in addition to all the macroblocks included in the search window.

Next, the reason why the image extension cores 171, 172, and 173 extend the macroblocks spaced one apart in the X direction as shown in FIG. 10 will be described. First, regarding the image extension core 173, at the time of extending the MB26, the MB15 located at the upper left of the MB26, the macroblock in MB16 located above the MB26, and the macroblock MB25 located at the left of the MB26 have already been extended. Then, the pixel referred to by the compression unit. 110 to generate the prediction data of the macroblock to be compressed exists in any one of the MB15, MB16, and MB25. Therefore, the image extension core 173 can extend the reference image based on the pixel data included in any of the MB15, MB16, or MB25 and the difference value between the pieces of pixel data included in the compressed data. Similarly, when the image extension core 172 extends the MB17, the MB06 located at the upper left of the MB17, the macroblock MB07 located above the MB17, and the macroblock MB16 located at the left of the MB17 have already been extended. Therefore, the image extension core 172 can extend the reference image based on the pixel data included in any one of the MB06, MB07, and MB16 and the difference value between the pieces of pixel data included in the compressed data. In this way, the reference image can be efficiently extended by extending the macroblocks at locations where the plurality of image extension cores are spaced one apart in the X direction.

Meanwhile, when the image extension core 171 extends the MB08, all the macroblocks included in the macroblock line MBLn−1 one row above the macroblock line MBLn including the MB08 have already been extended. Among the pixels included in MBLn−1, the pixel that may be referred to when the macroblock included in MBLn is extended is the lowest pixel included in the MBLn−1. Therefore, the pixel line buffer 160 stores, in preparation for the extension of the macroblock line MBLn, the pixel data located on the lowermost line included in the MBLn−1 in the extension result. Consequently, the image extension core 171 can extend the reference image based on the pixel data included in the pixel line buffer 160, the macroblock MB07 located on the left side of the MB08, and the difference value between the pixel data of the encoding block included in the compressed data and the prediction data. Incidentally, the pixel line buffer 160 can be configured similarly to the pixel line buffer 150 shown in FIG. 6, so that a detailed description thereof will be omitted.

(Operation)

Next, an operation of the video image encoding device 18 will be described. Hereinafter, a divided image to be a predictive encoding target of an image, that is, an encoding block is described as a macroblock, but the unit of the block to be divided is not limited to the macroblock. For example, it may be a coding unit that is a unit of an encoding processing when encoding is performed according to the HEVC standard.

First, the lossless compression of the reference image performed by the compression unit 110 will be described as a premise of an operation description of the video image encoding device 18. The compression unit 110 inputs the reference image, and performs lossless compression to it, thereby generating compressed data. For example, in securing a 3×3 search window, the three image extension cores 171, 172, and 173 need to operate in parallel. When the three image extension cores 171, 172, and 173 operate in parallel, for example, a head of the compressed data stored by the image extension core 172 needs to be continuous with the final data of the image extension core 171. However, since the compressed data has a variable length, a final data position of the image extension core 171 cannot be known in advance. Therefore, in the present embodiment, the compressed data is stored in the reference image memory 113 for each unit area, so that it can be started from a fixed position.

Figure 11:
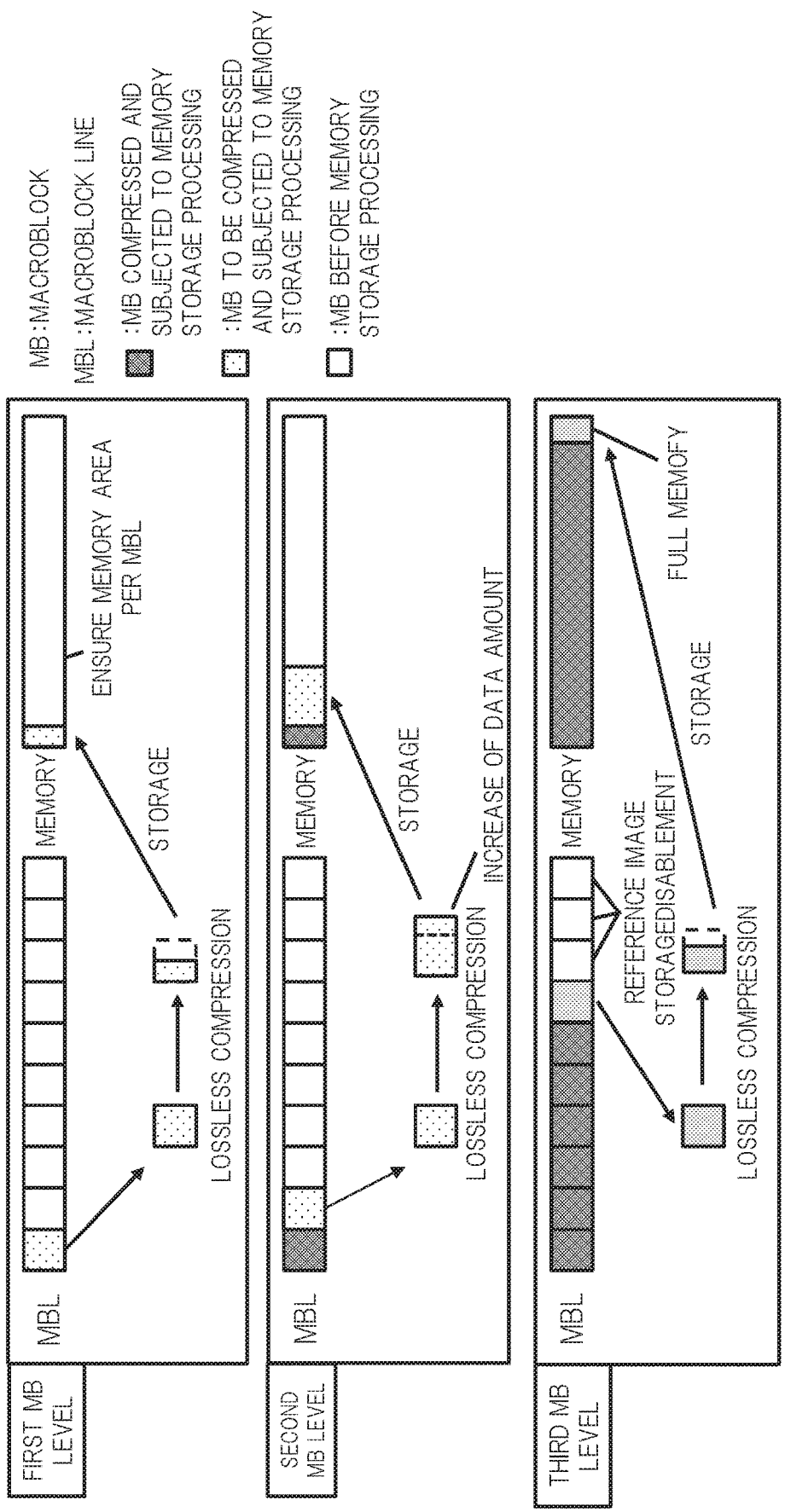
FIG. 11 is a view showing an example of an operation of the video image encoding device according to the first embodiment.

FIG. 11 is a view exemplifying a storage determination operation to the reference image memory. The video image encoding device 18 losslessly compresses the reference image for each macroblock and stores, in the reference image memory 113, the compressed data obtained by compressing the reference image. FIG. 11 shows an example of an operation when the unit area is 1 MBL. As shown in FIG. 11, when the compressing unit 110 compresses a reference image corresponding to a 1 MB level (first MB) of a certain macroblock line MBL, a size of the compressed data becomes smaller than the original data size. However, when the compression unit 110 losslessly compresses a reference image corresponding to a 2 MB level (second MB) of the macroblock line MBL, a size of the compressed data is larger than the original data size. However, in the present embodiment, a write amount to the reference image memory 113 is controlled so as not to exceed a data amount set by the allowable data amount setting unit 141 for each macroblock line, so that no problem of data overwriting arises. Next, when the compression unit 110 stores compressed data corresponding to an x (x is a natural number) MB level (xth MB) in the reference image memory 113, a memory amount set by the allowable data amount setting unit 141 is expended. Therefore, the reference image storage determination unit 111 determines that there is no remaining capacity in the reference image memory 113 for the subsequent MBs, and does not store the compressed data in the reference image memory 113.

Figure 12:
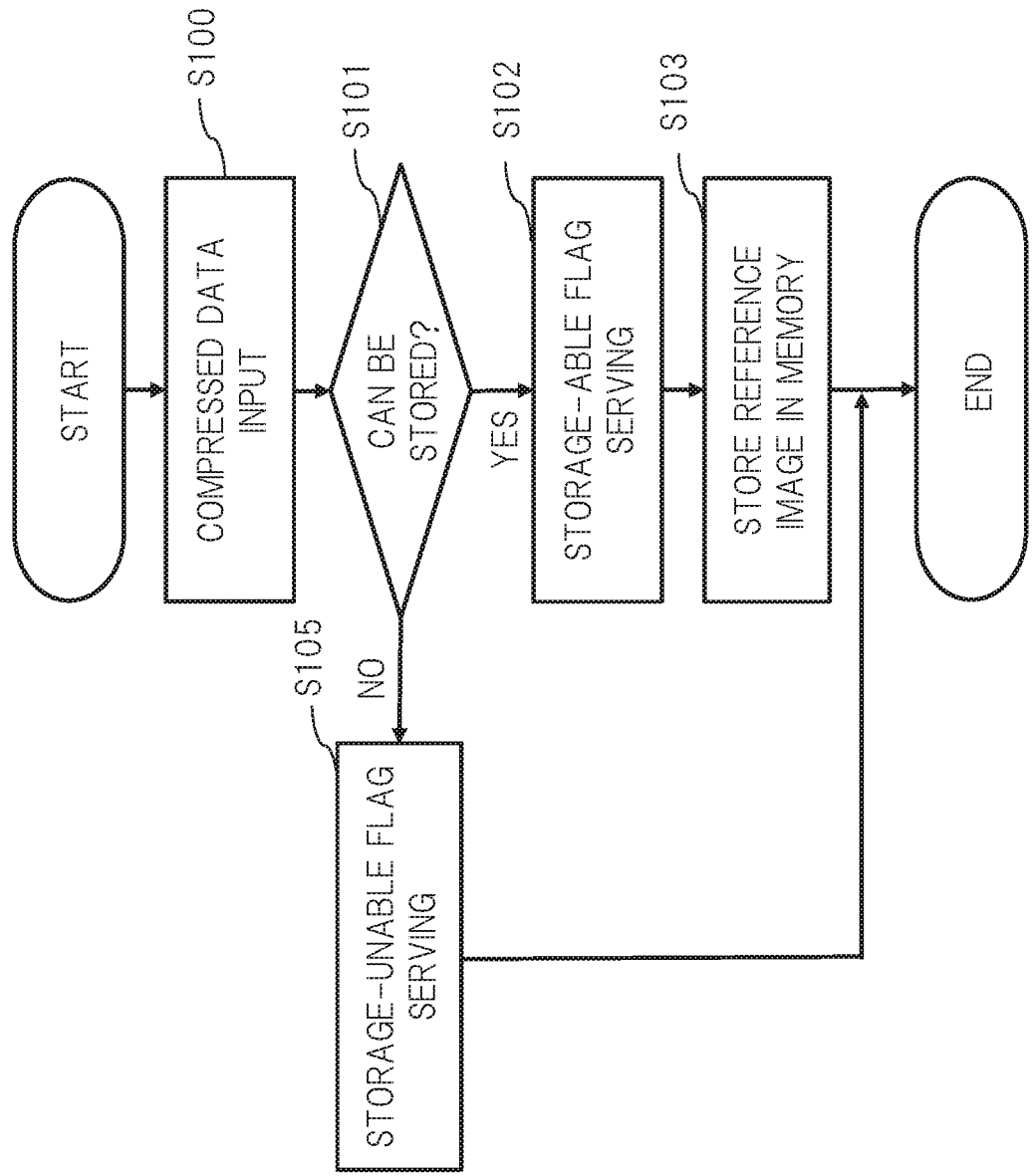
FIG. 12 is a flowchart showing an example of a determination processing by the reference image storage determination unit according to the first embodiment.

FIG. 12 is a flowchart showing an example of a processing in which the reference image storage determination unit 111 determines whether to store the compressed data obtained by compressing the reference image in the reference image memory 113. The reference image storage determination unit 111 receives the compressed data from the compression unit 110 (step S100) and determines whether the compressed data can be stored in the reference image memory 113 (step S101). When the reference image memory 113 has a free space (step S101: YES), the reference image storage determination unit 111 transmits determination result information 148, which indicates that the storage is possible, to the flag storage unit 114. The flag storage unit 114 stores a flag indicating storage is possible (for example, 1) and length information of the compressed data (step S102). The reference image storage determination unit 111 further transmits determination result information 148, which indicates that storage is possible, to the memory control unit 112. The memory control unit 112 stores the compressed data in the reference image memory 113 based on the determination result information 148 indicating that the data can be stored (step S103), and ends the processing. When the capacity of the reference image memory 113 is insufficient (step S101: NO), the reference image storage determination unit 111 transmits determination result information 148, which indicates that storage is impossible, to the flag storage unit 114. The flag storage unit 114 stores a flag (for example, 0) indicating that storage is impossible (step S105), and ends the processing.

FIG. 13 is a view showing an example of a storage state of compressed data of a frame referred to by the video image encoding device 18. FIG. 13 shows a part of the reference frame image to be referenced to from the current frame of an encoding target. The encoding macroblock is located at the MB14 in the current frame. In the example of FIG. 13, the search window is set in an area that includes 3×3 MBs and is centered about the encoding macroblock. The extension unit 116 extends the macroblock lines MBLn, MBLn+1, and MBLn+2 in parallel. Referring to the macro block line MBLn, the compressed data corresponding to the MB00 to the MB04 is stored in the reference image memory 113. Therefore, the image extension core 171 sequentially extends the MB00 to MB04. Meanwhile, since the MB05 to MB09 are not stored in the reference image memory 113, the image extension core 171 does not extend the reference image at positions of the MB05 to MB09. Similarly, the image extension core 172 sequentially extends the MB10 to MB15. However, since the MB16 to MB19 are not stored in the reference image memory 113, the image extension core 172 does not extend the reference images at positions of the MB16 to MB19. The image extension core 173 also sequentially extends the MB20 to MB23. However, since the MB24 to MB29 are not stored in the reference image memory 113, the image extension core 173 does not decompress the reference images at positions of the MB24 to MB29. The motion detection buffer 180 stores the reference images of the MB03, MB04, MB13, MB14, MB15, and MB23 extended by the extension unit 116. The inter prediction unit 102 performs motion prediction by using, as a search range(s), the reference images of the MB03, MB04, MB13, MB14, MB15, and MB23 stored in the motion detection buffer 180.

Incidentally, as shown in FIG. 10, the image extension cores 171, 172, and 173 are controlled so as to extend macroblocks spaced one apart in the X direction. This relationship is maintained even for the macroblocks in each of which compressed data is not stored in the reference image memory 113. For example, at a certain point in time, the image extension cores 171, 172, and 173 set the MB06, MB15, and MB24 as extension target macroblocks, respectively. However, two pieces of compressed data corresponding to the MB06 and MB24 are not stored in in the reference image memory 113. In such a case, the image extension cores 171, 173 are controlled so as to perform no processing (NOP (No Operation)) while the image extension core 172 is extending the MB15. Similarly, when the image extension cores 171, 172, and 173 respectively set the MB08, MB17, and MB26 as macroblocks of extension targets, the image extension cores 171, 172, and 173 are all controlled as NOPs. In this way, the relationship in which the image extension cores 171, 172, and 173 extend the macroblocks spaced one apart in the X direction of FIG. 10 is always maintained.

Figure 14A:
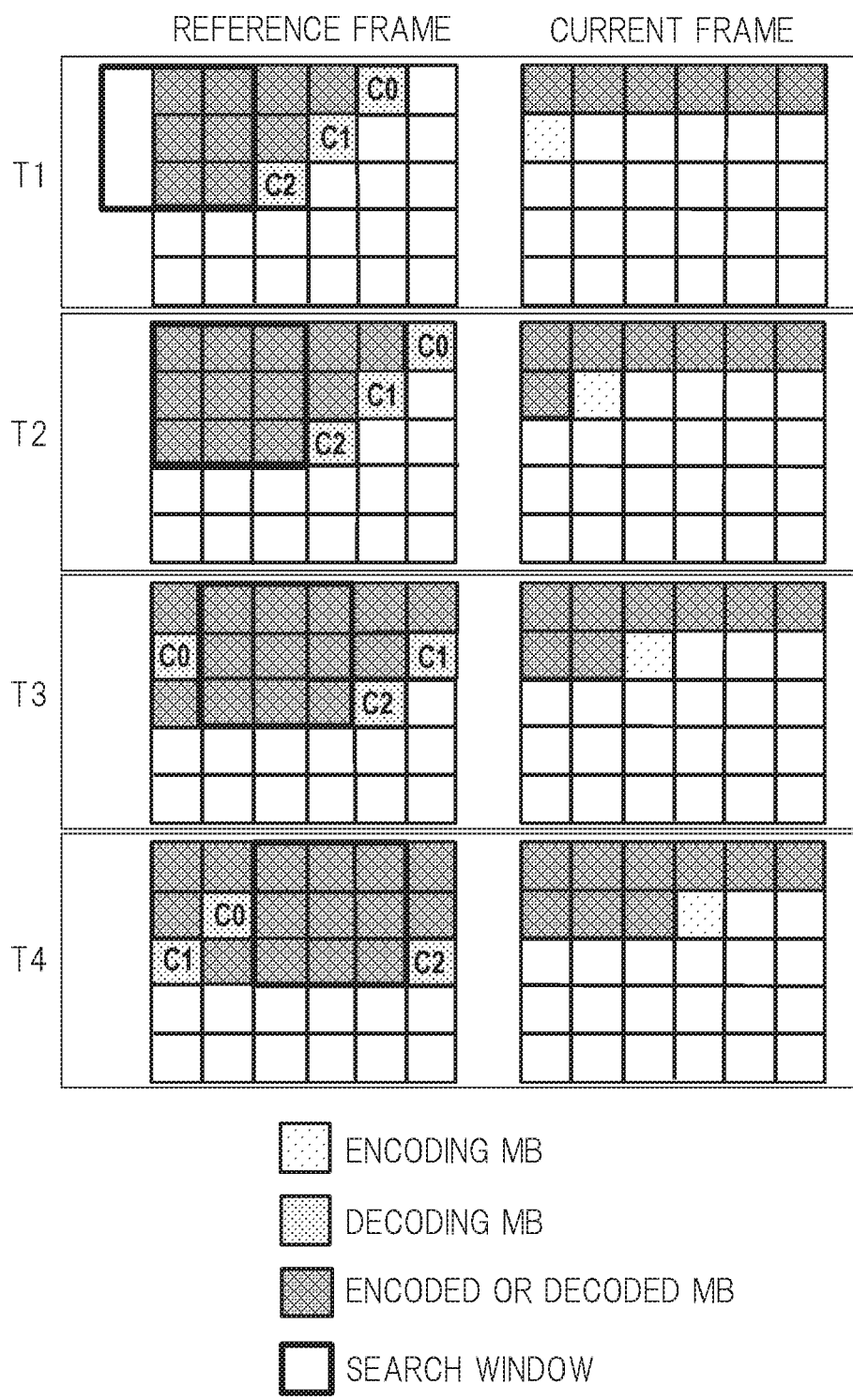
FIG. 14A is view exemplifying an extension pipeline processing performed by the extension unit according to the first embodiment.
Figure 14B:
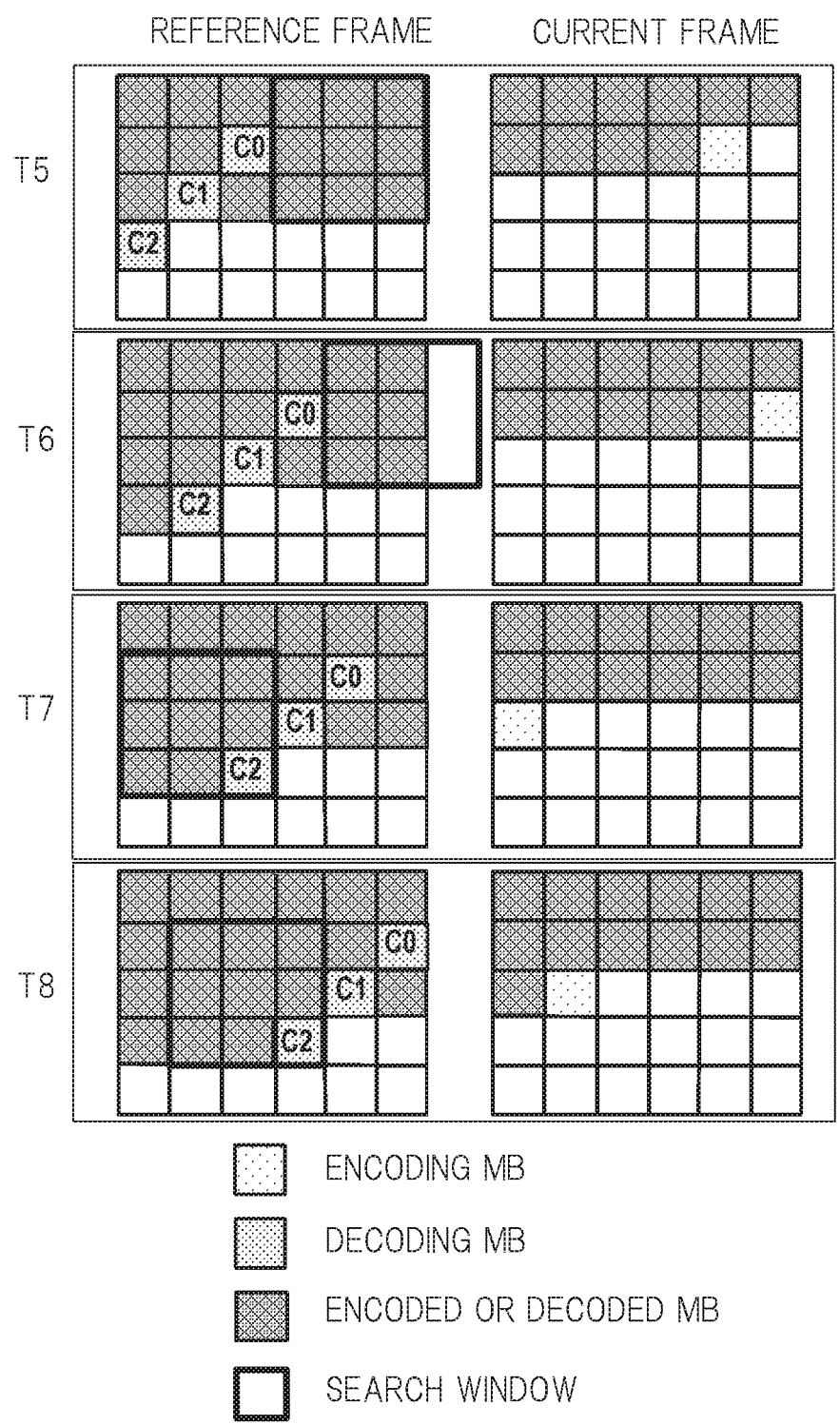
FIG. 14B is a view exemplifying an extension pipeline processing performed by the extension unit according to the first embodiment.

FIGS. 14A and 14B are views each exemplifying a time-series relationship between the encoding macroblock of the current frame and the MB subjected to the extension processing of the reference frame. As shown in FIGS. 14A and 14B, in this operation example, an image of one frame is composed of 6×5 MB (96×80 pixels), and a search window is set to an area of 3×3 MB as indicated by a thick square. The extension unit 116 includes image extension cores 171, 172, and 173.

In cycle T1, a first MB from left on a second MBL from a top of the current frame is MB of an encoding target. Meanwhile, in a referenced frame, in cycle T1, a fifth MB from left on a first MBL, a fourth MB from left on second MBL, and a third MB from left on a third MBL are extended by the image extension cores 171, 172, and 173, respectively. In FIGS. 14A and 14B, the MB extended by the image extension core 171 is denoted by symbol C0. Similarly, the MB extended by the image extension core 172 is denoted by symbol C1, and the MB extended by the image extension core 173 is denoted by symbol C2. The search window is set to 3×3 MB centered about the encoding macroblock, but three MBs in a left-side one column in the search window are outside the reference frame, so that no reference image exists. Therefore, in cycle T1, three MBs in the leftmost column in the search window are padded with a reference image corresponding to an MB position of an encoding target, and the reference image is generated.

Next, in cycle T2, a second MB from left on a second MBL from the top of the current frame is an encoding macroblock. Meanwhile, in the referenced frame, a sixth MB from left on a first MBL, a fifth MB from left on a second MBL, and a fourth MB from left on a third MBL are extended by the image extension cores 171, 172, and 173, respectively. In cycle T2, 3×3 MBs are included in the search window.

In cycle T3, a third MB from left on a second MBL from the top of the current frame is an encoding macroblock in the referenced frame, a first MB from left on a second. MBL, a sixth. MB from left on a second MBL, and a fifth MB from left on a third MBL are extended by the image extension cores 171, 172, and 173, respectively. In a case where each position of the MBs extended by the image extension cores 171, 172, 173 arrives at a right end of the referenced frame so that a position of the MB extended by the image extension core 171 in cycle T3 have transited to the next MBL, the MB to be extended transits to the next MBL.

As shown in FIGS. 14A and 14B, the operations described in cycles T1, T2, and T3 are continued also in cycles T5, T6, T7, and T8 (see FIG. 14B) after cycle T4. That is, the position of the MB to be encoded and each position of the MBs extended by the image extension cores 171, 172, and 173 change by 1 MB from the upper left toward the lower right in the frame. As described above, since the image extension cores 171, 172, and 173 extend the reference image in a pipeline manner, the MBs included in the search window can be extended before the encoding.

Figure 15:
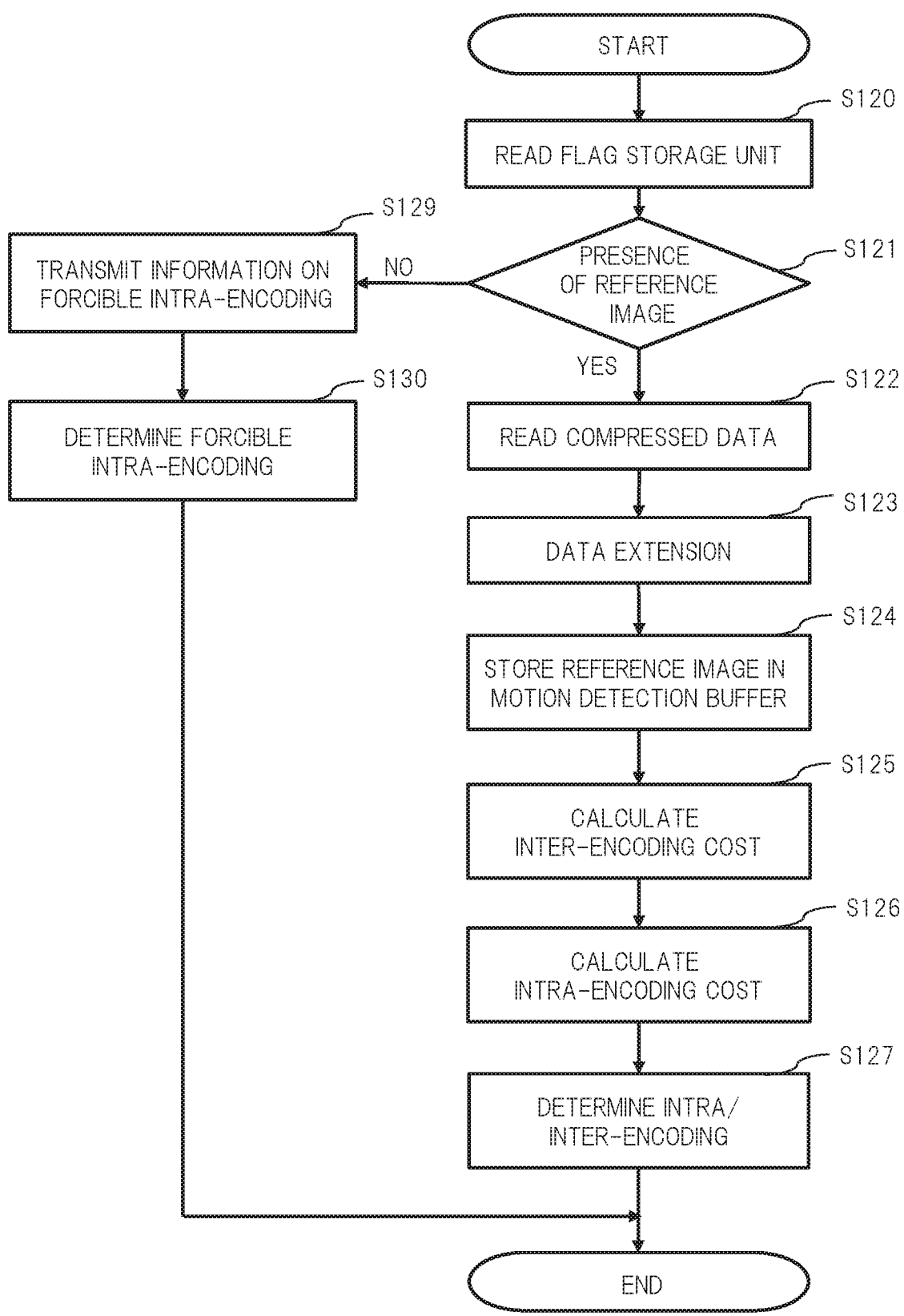
FIG. 15 is a flowchart showing an example of an intra/inter encoding determination processing in the video image encoding device according to the first embodiment.

FIG. 15 is a flowchart showing an example of intra/inter encoding determination processing in the video image encoding device 18. Since the inter prediction unit 102 performs motion detection by using the reference image, the reference image presence/absence determination unit 115 reads the flag stored in the flag storage unit 114 within a range of the search window that s a searchable range (step S120). When the reference image is stored in the reference image memory 113 (step S121: YES), the reference image presence/absence determining unit 115 requests a read access to the reference image memory 113 with respect to the memory control unit 112. The memory control unit 112 reads the compressed data, for which a read access request has been made, from the reference image memory 113, and sends it to the reference image presence/absence determination unit 115 (step S122). The reference image presence/absence determination unit. 115 transmits the read compressed data to the extension unit 116. The extension unit 116 extends the received compressed data (step S123), and stores the extended reference image in the motion detection buffer 180 (step S124). Since it is determined in step S121 that the reference image is stored in the reference image memory 113, the number of reference images transmitted to the inter prediction unit 102 in step S123 is one or more, and may be two or more.

The inter prediction unit 102: estimates a code amount in inter-encoding from the difference between the input image and the reference image for each reference image that is within the search window and stored in the motion detection buffer 180; and calculates inter encoding cost corresponding to the estimated code amount (step S125). The inter prediction unit. 102 further calculates the minimum inter encoding cost among the calculated one or more inter encoding costs, and transmits the minimum inter encoding cost to the intra/inter determination unit. Furthermore, the inter prediction unit 102 transmits an inter prediction image to the intra/inter determination unit 103.

The intra prediction unit 101 estimates a code amount when the input image is encoded in a plurality of intra modes. The intra prediction unit 101 calculates intra encoding cost corresponding to the estimated code amount (step S126). The intra prediction unit 101 further transmits, as the minimum intra encoding cost, the smallest intra encoding cost among the calculated intra encoding costs to the intra/inter determination unit 103. The intra prediction unit 101 further transmits an intra prediction image to the intra/inter determination unit 103.

Then, the intra/inter determination unit 103 compares the minimum intra encoding cost and the minimum inter encoding cost, determines a prediction mode with a small encoding cost, transmits a prediction image to a subtractor 120 based on the determined prediction mode (step S127), and ends an intra/inter encoding determination processing.

Meanwhile, when the reference image is not stored in the reference image memory 113 within the searchable range (step S121: NO), the reference image presence/absence determination unit 115 transmits, to the intra/inter determination unit 103, information for instructing it to forcibly intra-encode (step S129). The intra/inter determination unit 103 receives the information for instructing it to forcibly intra-encode, and determines to intra-encode the macroblock of an encoding target. The intra/inter determination unit 103 transmits, as a prediction image, the intra prediction image to the subtractor 120 (step S130), and ends an intra/inter encoding determination processing.

(Effect)

According to the first embodiment, the video image encoding device 18 includes: the compression unit 110 that losslessly compresses the reference image to generate compressed data; the pixel line buffer 150; the allowable data amount setting unit 141; and the reference image storage determination unit 111. Since the compression unit 110 can refer to the pixel data stored in the pixel line buffer 150, the compression efficiency can be improved. Further, the reference image storage determination unit 111 determines, based on the allowable data amount set in the allowable data amount setting unit 141, whether the compressed data obtained from the reference image compressed by the compression unit 110 is stored in the reference image memory 113. Therefore, even if the memory capacity usable as the reference image memory 113 is small, the number of reference images stored in the reference image memory 113 can be increased according to a compression result of the compression unit 110. As a result, the video image encoding device 18 according to the first embodiment can maximize the number of reference images stored in the reference image memory 113, and can encode while suppressing deterioration of image quality due to a small memory capacity.

Generally, a vehicle-mounted camera module (for example, camera module 1) is waterproof because a camera exists outside the vehicle. Consequently, an inside of the vehicle-mounted camera module is sealed, and easily accumulates heat. Therefore, in a video image encoding device that encodes a video image(s) inputted from the vehicle-mounted camera, it is difficult to have a large capacity DRAM (Dynamic Random. Access Memory) outside the video image encoding device due to problems of heat and space, and it is also difficult to have an SRAM, which has the same capacity as a DRAM, inside the video image encoding device in terms of cost and circuit scale. Therefore, the video image encoding device 18 according to the first embodiment, which is capable of encoding a video image(s) by using a small capacity memory, is suitable for the vehicle-mounted camera module.

Second Embodiment

Next, a second embodiment will be described. A video image encoding device 18A according to a second embodiment is different from the video imager encoding device 18 according to the first embodiment in including a compression unit 110A instead of the compression unit 110, and an extension unit 116A instead of the extension unit 116. The other configurations and operations are almost the same as those of the video image encoding device 18 described in the first embodiment, so that the same configurations are denoted by the same reference numerals and the duplicate description will be omitted.

(Constitution)

Figure 16:
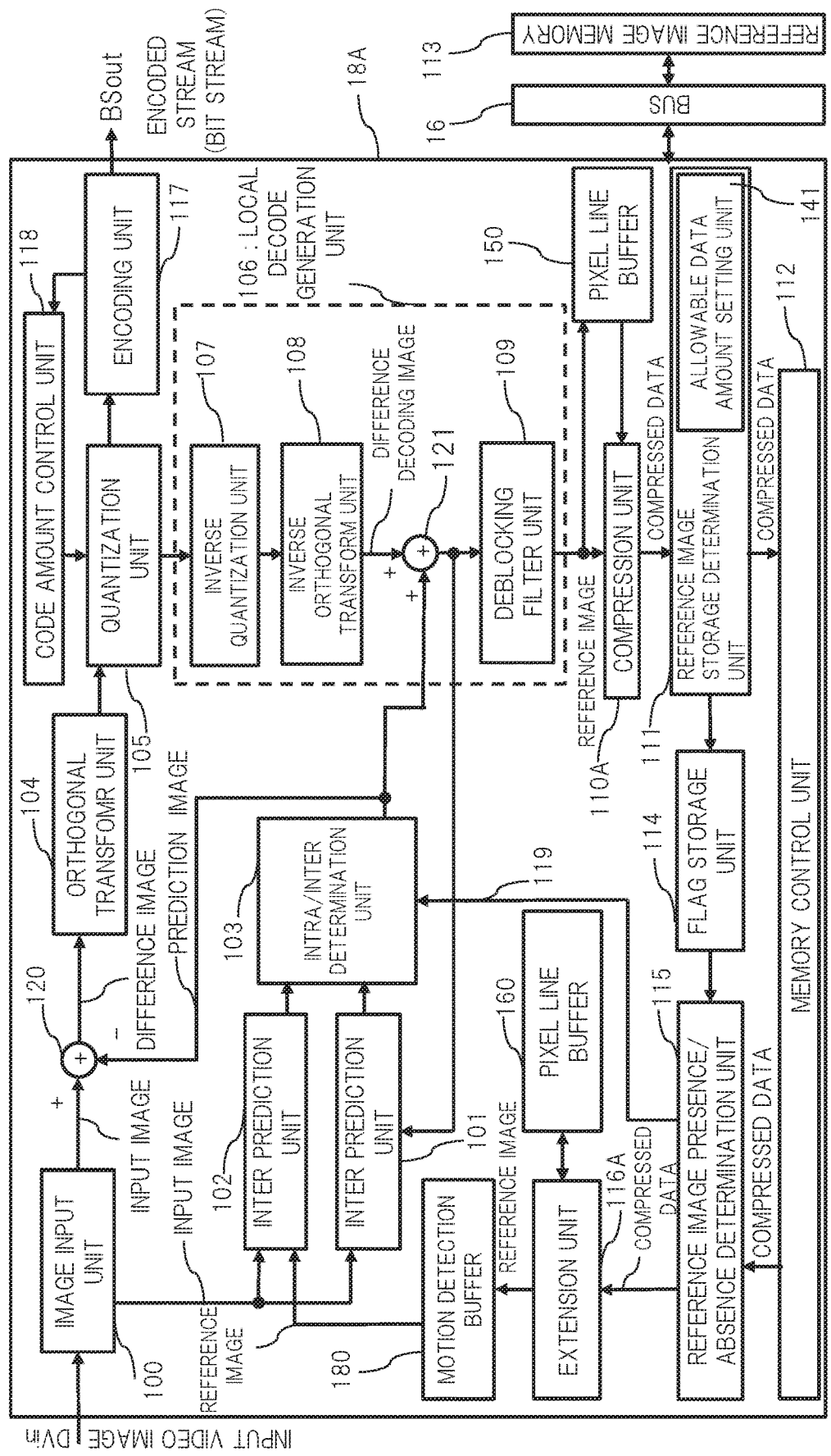
FIG. 16 is a block diagram showing a configuration example of a video image encoding device according to a second embodiment.

FIG. 16 is a block diagram showing a configuration example of the video image encoding device 18A according to the second embodiment. As shown in FIG. 16, the video image encoding device 18A according to the second embodiment includes the compression unit 110A and the extension unit 116A.

The compression unit 110A losslessly compresses the reference image received from the local decode generation unit. 106, and outputs it to the reference image storage determination unit 111. The compression unit 110A according to the second embodiment differs from the compression unit 110 according to the first embodiment in that the reference image is compressed by also referring to a block located at an upper right side of a block of encoding and compressed targets.

Figure 17:
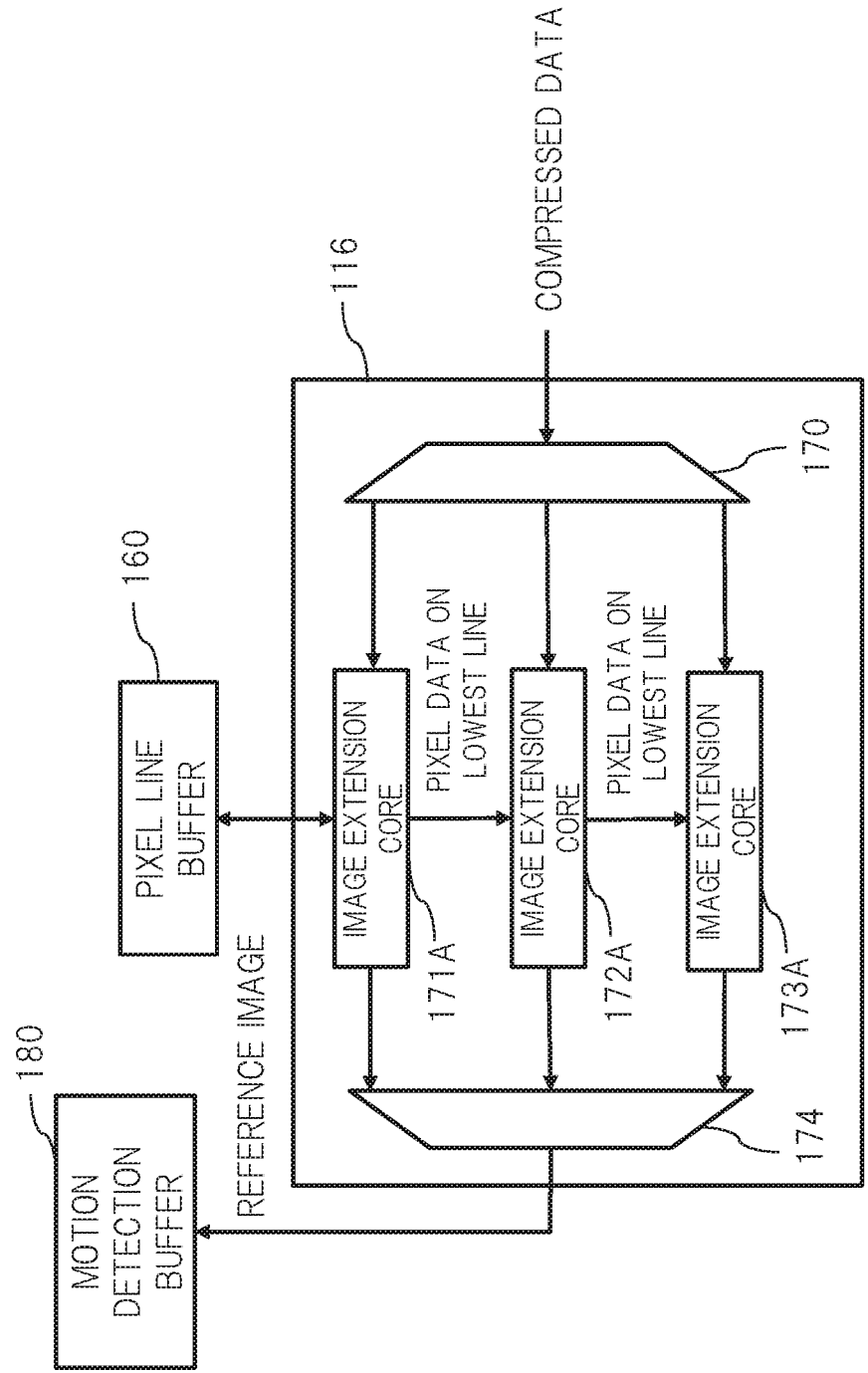
FIG. 17 is a block diagram showing a configuration example of the extension unit according to the first embodiment.

The extension unit 116A performs an extension processing to the compressed data of the reference image read from the reference image memory 113, and transmits the reference image, which is a result of the extension processing, to the inter prediction unit 102. FIG. 17 is block diagram showing a configuration example of the extension unit 116A. As shown in FIG. 17, the extension unit 116A according to the second embodiment includes image extension cores 171A, 172A, and 173A. The image extension cores 171A, 172A, and 173A are different from the image extension cores 171, 172, and 173 according to the first embodiment in that they decode the macroblocks spaced two apart in the X direction of FIG. 10, respectively.

(Operation)

As shown in FIG. 5, when the compression unit 110 compresses the macroblock X, the video image encoding device 18 according to the first embodiment has referred to the pixels included in, with respect to the macroblock X, the macroblock A adjacent to its upper left side, the macroblock B adjacent to its top, and the macroblock C adjacent to its left side. In contrast, the video image encoding device 18 according to the second embodiment also refers to pixel data included in a block located at the upper right side of an encoding block to compress the reference image.

Figure 18:
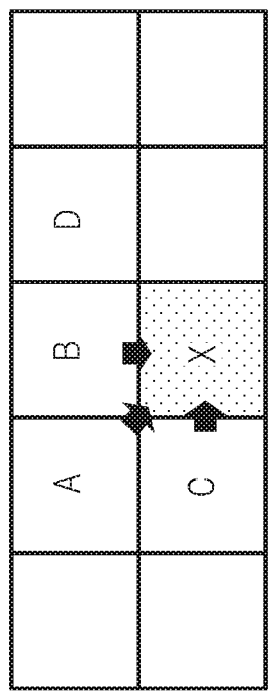
FIG. 18 is a view showing a position of an image referred to by a compression unit according to the second embodiment in compressing an image of an encoding target.

FIG. 18 is a view showing a macroblock position to be referred to which the video image encoding device 18A according to the second embodiment compresses the reference image. As shown in FIG. 18, the compression unit 116A according to the present embodiment also refers to pixels included in, with respect to the macroblock X, a macroblock D adjacent to its upper right side in addition to the macroblock A adjacent to its upper left side, the macroblock B adjacent to its top, and the macroblock C adjacent to its left side, compresses the reference image corresponding to the macroblock X of an encoding target, and generates compressed data.

Further, as shown in FIG. 10, in the extension unit 116 according to the first embodiment, the image extension cores 171, 172, and 173 have extended, in parallel, the macroblocks spaced one apart from each other in the X direction, respectively. However, in the extension unit 116A according to the second embodiment, the image extension cores 171A, 172A, and 173A extend the macroblocks spaced two apart in the X direction of FIG. 10, respectively. This point will be described with reference to FIG. 19.

Figure 19:
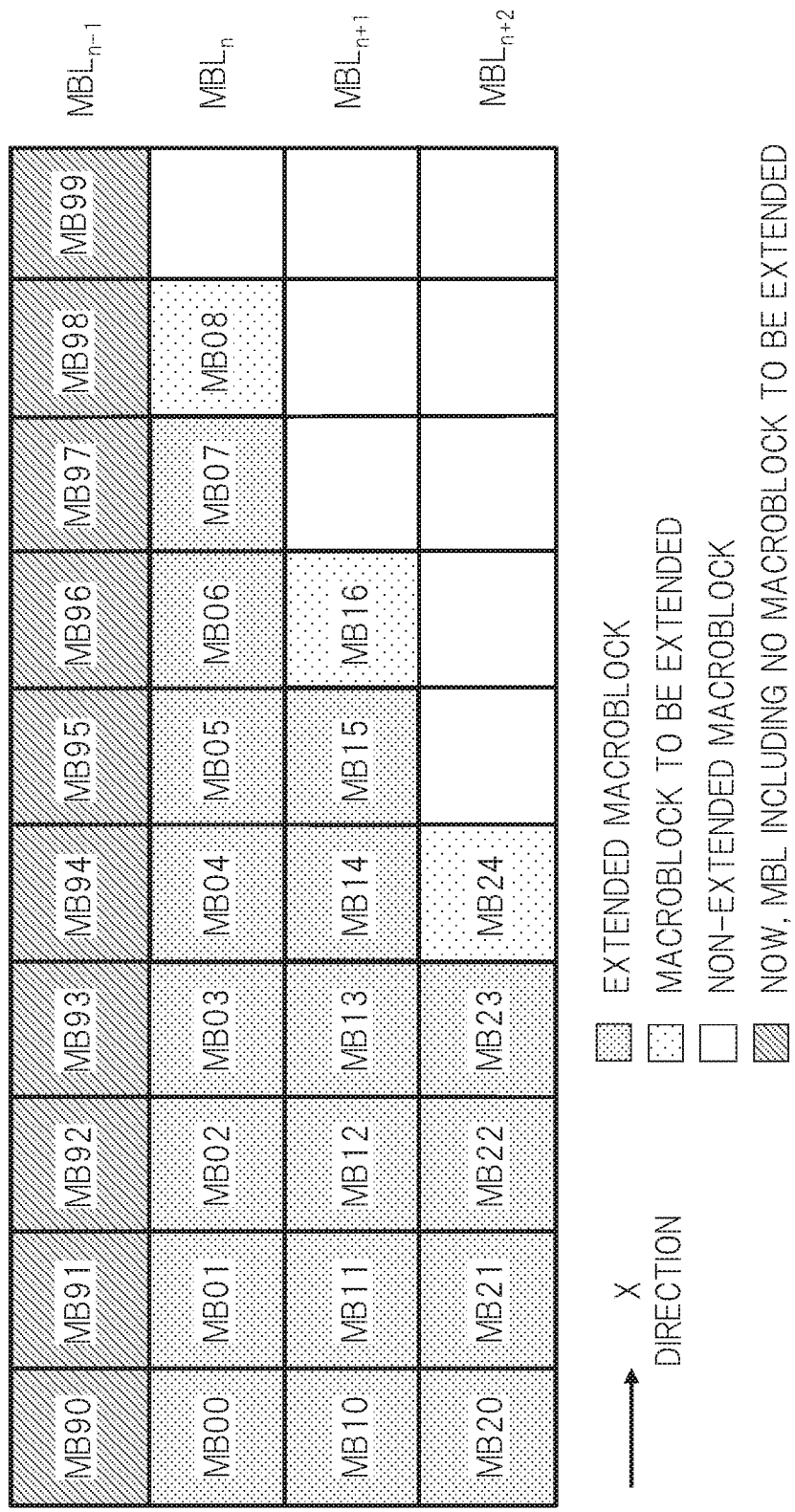
FIG. 19 is a view showing an example of a decoding processing performed by an extension unit according to the second embodiment.

FIG. 19 is a view showing a state where the image extension cores 171A, 172A, and 173A according to the second embodiment perform extension processings in parallel. In FIG. 19, macroblock lines MBLn−1, MBLn, MBLn+1, and MBLn+2 are shown. In an example of FIG. 19, a size of a search window is defined as nine macroblocks included in a 3×3 rectangular area. Since height of the search window corresponds to three macroblocks, the extension unit 116 extends the macroblock lines MLBn, MBLn+1, and MBLn+2 in parallel. As a result, the extension unit 116 extends the three macroblocks in parallel in order to perform one motion detection. Incidentally, the macroblock line MBLn−1 is a macroblock line that has been extended before the extension unit 116 extends the macroblock lines MBLn, MBLn+1, and MBLn+2.

Referring to FIG. 19, the image extension cores 171A, 172A, and 173A extends, in parallel, the macroblock MB08 included in the macroblock line MBLn, the macroblock MB16 included in the macroblock line MBLn+1, and the macroblock MB24 included in the macroblock line MBLn+2, respectively. As shown in FIG. 19, the image extension cores 171A, 172A, and 173A extend macroblocks spaced two apart in the X direction.

Next, the reason why the image extension cores 171A, 172A, and 173A extend the macroblocks spaced two apart in the X direction as shown in FIG. 19 will be described. First, regarding the image extension core 173A, at the time of extending the MB24, the MB13 adjacent to the upper left side of the MB24, the macroblock MB14 adjacent to the upper side of the MB24, the macroblock MB15 adjacent to the upper right side of the MB24, and the macroblock MB23 adjacent to the left side of the MB24 have already been extended. Then, the pixel referred to in order to minimize the difference between the pixel data of the encoding block and the prediction data when the compression unit 110A compresses the reference image exists in any of the MB13, MB14, MB15, or MB23. Therefore, the image extension core 173A can extend the reference image based on the pixel data included in any of the MB13, MB14, MB15, or MB23 and on the difference value between the pixel data of the encoding block and the prediction data included in the compressed data. Similarly, when the image extension core 172A extends the MB16, the MB05 adjacent to the upper left side of the MB16, the macroblock MB06 adjacent to the upper side of the MB16, the macroblock MB07 adjacent to the upper right side of the MB16, and the macroblock MB15 adjacent to the left side of the MB16 have already been extended. Therefore, the image extension core 172A can extend the reference image based on the pixel data included in any of the MB05, MB06, MB07, and MB15 and on the difference value between the pixel data of the encoding block and the prediction data included in the compressed data. In this way, the plurality of image extension cores extend the macroblocks spaced two apart in the X direction, so that efficient extension becomes possible.

Meanwhile, at the time when the image extension core 171A extends the MB08, all the macroblocks included in the macroblock line MBLn−1 one row above the macroblock line MBLn including the MB08 have been extended. Among the pixels included in the MBLn−1, the pixel that may be referred to when the macroblock included in the MBLn is extended is a pixel located on the lowest line included in the MBLn−1. Therefore, the pixel line buffer 160 stores, in preparation for the extension of the macroblock lines MBLn, MBLn−1, and MBLn+2, the pixel located on the lowest line included in the MBLn−1 out of extension results. Consequently, the image extension core 171A can extend the reference image base on the pixel data included in the pixel line buffer 160, the macroblock MB07 adjacent to the left side of the MB08 and on the difference value between the pixel data of the encoding block and the prediction data included in the compressed data.

(Effect)

Since macroblock positions extended by the extension unit 116A are spaced two MBs apart in the X direction, the extension unit 116A also refers to the pixels included in the macroblock located on the upper right side of the macroblock of an encoding target, and can compress the reference image. The video image encoding device 18A according to the second embodiment can widen the range of pixels to be referred to as compared with the video image encoding device 18 according to the first embodiment. Therefore, the video image encoding device 18A according to the second embodiment can increase (enhance) a compression rate of the reference image. This makes it possible to further increase the number of reference images that can be stored in the reference image memory 113. As a result, in encoding a video image(s) of the next frame, it is possible to increase a rate at which the inter encoding is executed, improve the encoding efficiency, and improve the image quality.

Although the invention made by the present invention has been specifically described based on the embodiments, the present invention is not limited to the embodiments already described, and various modifications can be made without departing from the scope of the invention. For example, in the descriptions of the first and second embodiments, when the unit area (for example, MB) is encoded, the reference image is stored in the reference image memory 113 for each divided image (for example, MB) However, storing the reference images in the reference image memory 113 may collectively be performed after determining whether or not all the divided images (for example, all MBs) included in the unit area can be stored into the reference image memory 113. May be done. That is, storing the reference images into the reference image memory 113 may collectively be performed after determining whether or not all the MBs in one MBL can be stored in the reference image memory 113.

What is claimed is:

1. A video image encoding device comprising:
   an image encoding unit performing predictive encoding by obtaining a difference between a divided image included in a frame that is a target of predictive encoding of video image data and a predicted image;
   a local decode generation unit decoding an encoding result of the divided image to generate a reference image;
   a first buffer storing pixel data generated by the local decode generation unit;
   a compression unit that compresses the reference image by referring to the first buffer and generates compressed data;
   a storage data amount calculation unit calculating a storage data amount for a predetermined area of the frame by adding a stored data amount that is already stored in a memory and a data amount of the generated compressed data that is the target of the predictive encoding;
   an allowable data amount setting unit presetting an allowable data amount to be stored in the memory for the predetermined area of the frame;
   a comparison unit comparing the allowable data amount and the stored data amount for the predetermined area of the frame and outputs a comparison result; and
   a reference image storage determination unit storing the generated compressed data in the memory based on the comparison result.

2. The video image encoding device according to claim 1, wherein the compression unit losslessly compresses the reference image to generate the compressed data.

3. The video image encoding device according to claim 2, further comprising an inter prediction unit,
   wherein the inter prediction unit performs motion detection by using as a search range the reference image, which is stored in the memory and extends the compressed data related to a reference frame.

4. The video image encoding device according to claim 3, further comprising:
   a second buffer storing pixel data included in the reference image generated by the predictive encoding of the reference frame;
   an extension unit receiving from the memory the compressed data generated by the predictive encoding of the reference frame, referring to the pixel data stored in the second buffer, and extending the compressed data generated by the predictive encoding of the reference frame; and
   a third buffer storing the reference image generated by the extension unit through extension,
   wherein the inter prediction unit performs motion detection by using as a search range of the motion detection the reference image stored in the third buffer.

5. The video image encoding device according to claim 4, wherein a frame as a target of predictive encoding of the video image data includes a plurality of divided images divided in a matrix,
   the reference image is generated by the local decode generation unit for a divided image located at a first column on a first row, and
   the pixel data stored in the first buffer is generated by the local decode generation unit about any one of a divided image located at a second column adjacent to left of a first column on a second row adjacent to an upper side of the first row, a divided image located at the first column on the second row, and a divided image located at the second column on the first row.

6. The video image encoding device according to claim 5, wherein the reference frame includes a plurality of divided images divided in a matrix,
   the plurality of divided images include a first divided image and a second divided image, the extension unit includes a first image extension core and a second image extension core, the first image extension core extends compressed data read from the memory for the first divided image located at a third column on a third row, and the second image extension core extends compressed data read from the memory for the second divided image located at a fourth column adjacent to a right side of the third column on a fourth row adjacent to an upper side of the third row.

7. The video image encoding device according to claim 4, wherein the frame as a target of predictive encoding of the video image data includes a plurality of divided images that are divided in a matrix, the reference image is generated by the local decode generation unit for the divided image located at a first column on a first row, and the pixel data stored in the first buffer is generated by the local decode generation unit for any one of a divided image located at a second column adjacent to left of the first column on a second row adjacent to an upper side of the first row, a divided image located at the first column on the second row, a divided image located at a third column adjacent to right of the first column on the second row, and a divided image located at the second column on the first row.

8. The video image encoding device according to claim 7, wherein the reference frame includes a plurality of divided images divided in a matrix, the plurality of divided images include a first divided image and a second divided image, the extension unit includes a first image extension core and a second image extension core, the first image extension core extends about the first divided image located at a third column on a third row, and the second image extension core extends about the second divided image located at a fourth column, which is located two columns apart from right of the third column, on a fourth row adjacent to an upper side of the first row.

9. The video image encoding device according to claim 6, further comprising:

an intra prediction unit calculating a first encoding cost required in intra-encoding the divided image; and an intra/inter determination unit determining whether the divided image is intra-encoded or inter-encoded, wherein the intra prediction unit transmits the first encoding cost to the intra/inter determination unit, the inter prediction unit calculates a second encoding cost required in inter-encoding by using a difference between the divided image and a reference image stored in the third buffer, and transmits the second encoding cost to the intra/inter determination unit, and the intra/inter determination unit determines whether the divided image is intra-encoded or inter-encoded based on a comparison result of the first encoding cost and the second encoding cost.

10. The video image encoding device according to claim 9, wherein the intra prediction unit estimates a plurality of code amounts required when the divided image is encoded in a plurality of intra modes, and calculates a plurality of encoding costs based on the estimated plurality of code amounts, and transmits as the first encoding cost an encoding cost to be minimum among the plurality of encoding costs to the intra/inter determination unit, and the inter prediction unit estimates, for each reference image stored in the third buffer, a code amount required in inter-encoding from a difference between the divided image and the reference image stored in the third buffer, calculates an encoding cost based on the estimated coding amount, and transmits as the second encoding cost an encoding cost to be minimum among the reference images stored in the third buffer to the intra/inter determination unit.

11. The video image encoding device according to claim 1, wherein the divided image included in the frame as a target of predictive encoding of the video image data is a macroblock, a defined area of the frame as the target of the predictive encoding of the video image data is a macroblock line, and the allowable data amount is predetermined for each macroblock line.

12. An operating method of a video image encoding device, the video image encoding device including an image encoding unit, a local decode generation unit, a first buffer, a compression unit, an allowable data amount setting unit, and a reference image storage determination unit, the operating method comprising:

predictively encoding by obtaining a difference between a divided image included in a frame as a target of predictive encoding of video image data and a prediction image by the image encoding unit;

decoding an encoding result of the image encoding unit of the divided image by the local decode generation unit to generate a reference image;

storing pixel data generated by the local decode generation unit in the first buffer;

compressing the reference image with reference to the first buffer by the compression unit to generate compressed data;

calculating a storage data amount for a predetermined area of the frame by adding a stored data amount that is already stored in a memory and a data amount of the generated compressed data that is the target of the predictive encoding;

presetting an allowable data amount to be stored in the memory for the predetermined area of the frame;

comparing the allowable data amount and the stored data amount for the predetermined area of the frame and outputs a comparison result; and storing the compressed data in the memory by the reference image storage determination unit based on the comparison result.

13. The operating method according to claim 12, wherein the video image encoding device further includes a stored data amount calculation unit, a comparison unit, and an inter prediction unit, the operating method further comprises:

performing, by the inter prediction unit, motion detection by using as a search range a reference image obtained by extending compressed data on a reference frame stored in the memory, and generating the compressed data further includes losslessly compressing the reference image to generate the compressed data.

14. The operating method according to claim 12,
wherein the divided image included in the frame as the target of the predictive encoding is a macroblock,
the predetermined area of the frame as the target of the predictive encoding is a macroblock line, and
the allowable data amount is predetermined for each macroblock line.

15. The operating method according to claim 13,
wherein the video image encoding device further includes a second buffer, an extension unit, and a third buffer, and
the operating method further comprises:
storing, in the second buffer, pixel data included in the reference image generated by the predictive encoding of the reference frame;
extending, by a decompression unit, the compressed data generated by the predictive encoding of the reference frame with reference to the pixel data stored in the second buffer;
storing in the third buffer the reference image generated by the extension unit through extension; and
performing, by the inter prediction unit, motion detection by using, as a search range for motion detection, the reference image stored in the third buffer.

16. The operating method according to claim 15,
wherein the video image encoding device further includes an intra prediction unit and an intra/inter determination unit, and
the operating method further comprises:
calculating, by the intra prediction unit, a first encoding cost required in intra-encoding the divided image, and transmitting the first encoding cost to the intra/inter determination unit;
calculating, by the inter prediction unit, a second encoding cost required in inter-encoding by using a difference between the divided image and the reference image stored in the third buffer, and transmitting the second encoding cost to the intra/inter determination unit; and
determining, by the intra/inter determination unit, whether the divided image is intra-encoded or inter-encoded based on the first encoding cost and the second encoding cost.

17. A video image encoding device comprising:
an image encoding unit performing predictive encoding by obtaining a difference between a first block, which is divided into a plurality of blocks in a matrix and is included in a frame as a target of predictive encoding of a video image, and a reference image generated in encoding of a reference frame;
a local decode generation unit decoding an encoding result of the first block to generate a first reference image, and decoding an encoding result of a second block adjacent to the first block to generate a second reference image;
a first buffer storing pixel data included in the second reference image;
a compression unit compressing the first reference image by referring to the first buffer and generates compressed data;
a storage data amount calculation unit calculating a storage data amount for a predetermined area of the frame by adding a stored data amount that is already stored in a memory and a data amount of the generated compressed data that is the target of the predictive encoding;
an allowable data amount setting unit that presets an allowable data amount to be stored in the memory for predetermined area of the frame;
a comparison unit comparing the allowable data amount and the stored data amount for the predetermined area of the frame and outputs a comparison result; and
a reference image storage determination unit storing the generated compressed data in the memory based on the comparison result.

18. The video image encoding device according to claim 17, further comprising an inter prediction unit,
wherein the second block is located adjacent to an upper left, top, or left of the first block, and
the inter prediction unit performs motion detection by using as a search range a reference image corresponding to the compressed data stored in the memory.

19. The video image encoding device according to claim 17, further comprising an inter prediction unit,
wherein the second block is located adjacent to upper left, top, upper right, or left of the first block, and
the inter prediction unit performs motion detection by using as a search range a reference image corresponding to the compressed data stored in the memory.

* * * * *